US008145820B2

(12) United States Patent
Tanaka et al.

(10) Patent No.: US 8,145,820 B2
(45) Date of Patent: Mar. 27, 2012

(54) MULTIPROCESSOR SYSTEM AND COMPUTER PROGRAM PRODUCT

(75) Inventors: Hiroaki Tanaka, Tokyo (JP); Takeshi Kodaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 12/614,046

(22) Filed: Nov. 6, 2009

(65) Prior Publication Data

US 2010/0299472 A1    Nov. 25, 2010

(30) Foreign Application Priority Data

May 25, 2009 (JP) ................................. 2009-125591

(51) Int. Cl.
*G06F 13/24* (2006.01)
*G06F 9/46* (2006.01)
(52) U.S. Cl. ........ 710/267; 710/268; 710/269; 718/100; 718/103; 718/105
(58) Field of Classification Search .................. 710/267; 718/100, 105
See application file for complete search history.

(56) References Cited

U.S. PATENT DOCUMENTS

| 7,437,536 | B2 | 10/2008 | Iwamoto |
|---|---|---|---|
| 7,565,653 | B2 * | 7/2009 | Inoue et al. ................... 718/103 |
| 7,614,053 | B2 * | 11/2009 | Inoue et al. ................... 718/100 |
| 7,673,113 | B2 * | 3/2010 | Sugumar et al. .............. 711/170 |
| 7,761,612 | B2 * | 7/2010 | Corry et al. ........................ 710/8 |
| 7,921,330 | B2 * | 4/2011 | Riemers .......................... 714/20 |
| 2006/0095624 | A1 * | 5/2006 | Raj et al. ....................... 710/260 |
| 2008/0140866 | A1 * | 6/2008 | Corry et al. ........................ 710/8 |
| 2008/0184256 | A1 * | 7/2008 | Felter et al. .................... 718/105 |
| 2009/0083467 | A1 * | 3/2009 | Giles et al. .................... 710/268 |
| 2009/0222654 | A1 * | 9/2009 | Hum et al. ..................... 713/100 |

FOREIGN PATENT DOCUMENTS

| JP | 2005-235228 | 9/2005 |
|---|---|---|
| JP | 2005-235229 | 9/2005 |
| JP | 2006-216058 | 8/2006 |

* cited by examiner

*Primary Examiner* — Brian Misiura
(74) *Attorney, Agent, or Firm* — Oblon, Spivak, McClelland, Maier & Neustadt, L.L.P.

(57) ABSTRACT

In a multiprocessor system including a plurality of processors, the processors execute, at a time of migration a task operating in own processor to another processor, a transmitting task for transmitting the migration target task to a destination processor, and when an interrupt request to be received and executed by an interrupt handler accompanying the migration target task is generated during transmission of the migration target task, the transmitting task receives the interrupt request instead of the interrupt handler and starts the interrupt handler.

10 Claims, 26 Drawing Sheets

MULTIPROCESSOR SYSTEM AND COMPUTER PROGRAM PRODUCT

CROSS-REFERENCE TO RELATED APPLICATIONS

This application is based upon and claims the benefit of priority from the prior Japanese Patent Application No. 2009-125591, filed on May 25, 2009; the entire contents of which are incorporated herein by reference.

BACKGROUND OF THE INVENTION

1. Field of the Invention

The present invention relates to a multiprocessor system and a computer program product.

2. Description of the Related Art

Conventionally, in a multiprocessor system, there is a technique in which a task is migrated between processors to control a load balance of a processor group in order to improve processing efficiency or the like (see, for example, Japanese Patent Application Laid-open No. 2005-235229, Japanese Patent Application Laid-open No. 2006-216058, and Japanese Patent Application Laid-open No. 2005-235228).

Generally, however, when a task running on one processor is to be migrated to another processor, the task is temporarily suspended and migrated in a suspended state. At the time of task migration, the task and reception of an interrupt associated with the task are similarly handled. Therefore, when a task having an interrupt handler is migrated to another core, reception of interrupts is disabled. At this time, if an interrupt to be captured by the task during task migration occurs, the processor cannot capture the interrupt because reception of the interrupt is disabled. Therefore, there has been a problem that when a task having an interrupt handler is running, the task cannot be migrated.

BRIEF SUMMARY OF THE INVENTION

A multiprocessor system according to an embodiment of the present invention comprises a plurality of processors, wherein the processors execute, at a time of migrating a task running on own processor to another processor, a transmitting task for transmitting the migration target task to a destination processor, and when an interrupt request to be received and handled by an interrupt handler accompanying the migration target task is generated during transmission of the migration target task, the transmitting task receives the interrupt request instead of the interrupt handler and starts the interrupt handler.

A computer program product according to an embodiment of the present invention comprises a plurality of commands executable by a computer including a plurality of processors, wherein at a time of migrating a task running on own processor to another processor, when an interrupt request to be received and handled by an interrupt handler accompanying the migration target task occurs during transmission of the migration target task, the commands cause each of the processors to receive the interrupt request instead of the interrupt handler and start the interrupt handling.

DETAILED DESCRIPTION OF THE INVENTION

Exemplary embodiments of a multiprocessor system and a computer program product according to the present invention will be explained below in detail with reference to the accompanying drawings. The present invention is not limited to the following embodiments.

Figure 1:
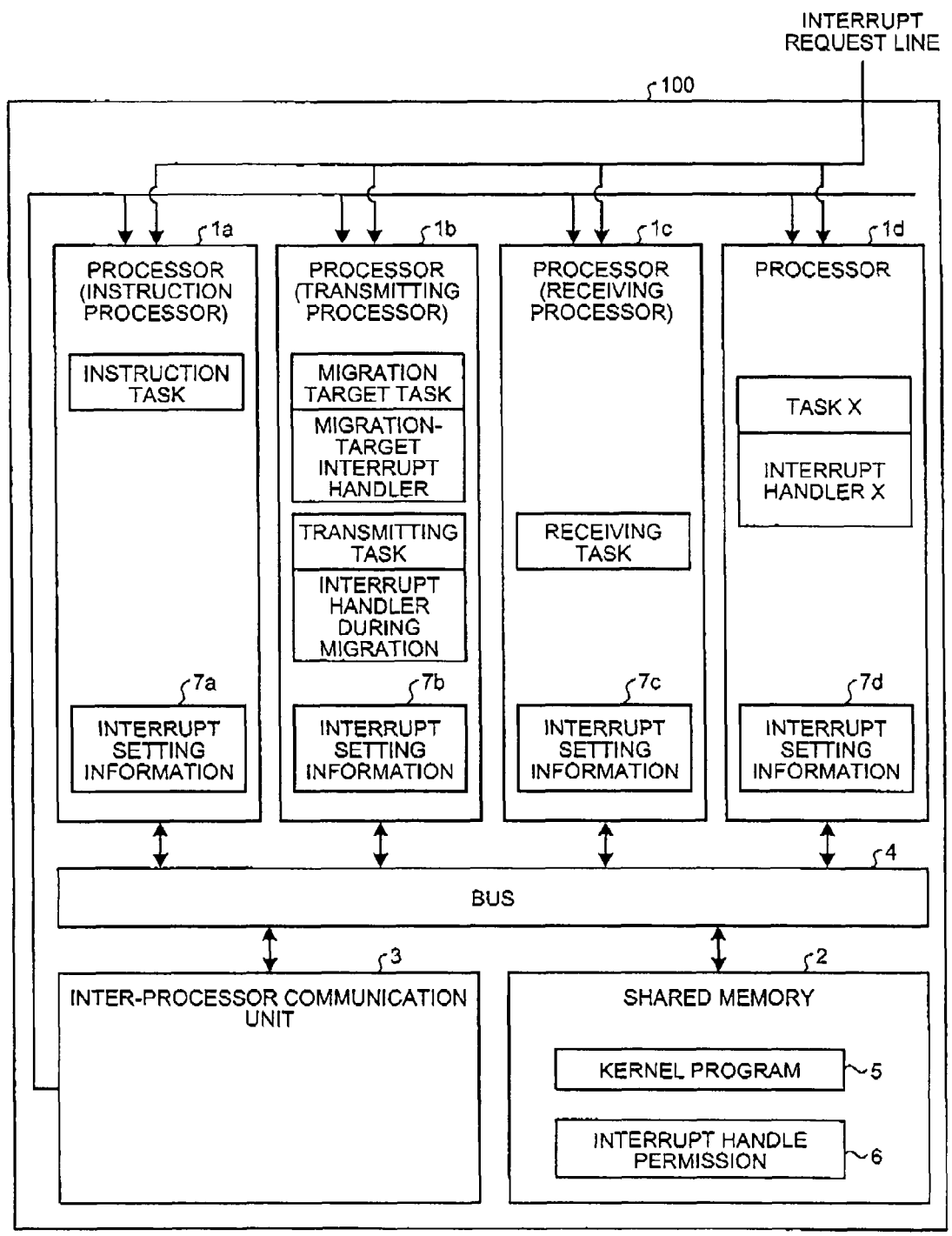
FIG. 1 is a schematic diagram for explaining a configuration of a multiprocessor system according to an embodiment of the present invention.

FIG. 1 is a block diagram of a configuration of a multiprocessor system according to an embodiment of the present invention. As shown in FIG. 1, in a multiprocessor system 100 according to the present embodiment, a plurality of (four) processors 1a to 1d, a shared memory 2 including a random access memory (RAM) and a static random access memory (SRAM), and an inter-processor communication unit 3 are respectively connected to a bus 4. The inter-processor communication unit 3 performs communications between the processors, and one end of a dedicated line for communication is connected to the inter-processor communication unit 3, and the other end thereof is branched into four and the branched ends are connected to the respective processors 1a to 1d. Communication of messages between the processors is performed via the inter-processor communication unit 3, and transfer of data is performed via the bus 4 and the shared memory 2. An interrupt request line for transmitting an interrupt request generated outside the multiprocessor system 100 is branched into four, and the branched ends are respectively connected to the processors 1a to 1d.

A kernel program 5 as a computer program product according to the present embodiment and a user program (not shown) prepared according to an intended use of the multiprocessor system 100 are loaded into the shared memory 2. A load source of these programs can be a read only memory (ROM) or an external memory that stores these programs beforehand. The processors 1a to 1d execute a kernel task included in the kernel program 5 and a user task included in a user program. It is assumed here that a task includes the kernel task and the user task.

The task is explained below. The multiprocessor system 100 can execute a task having an interrupt handler. For example, when the multiprocessor system 100 is incorporated in a device having a music playing function, the task having the interrupt handler includes a task to play music. The task has an interrupt handler for receiving an interrupt request for stopping and resuming playing music, and stopping and resuming playing music. According to a general scheduling method, when a task with an interrupt handler is migrated between processors, the multiprocessor system disables reception of the interrupts. Accordingly, even if an interrupt required to be captured by the task occurs while the task is migrated, the multiprocessor system cannot capture the interrupt. On the other hand, in the present embodiment, a dedicated kernel task is prepared for enabling reception of an interrupt during task migration.

Specifically, the kernel program 5 includes a task program for a migration instruction task for instructing task migration based on a load status of the processors 1a to 1d, another task program for a transmitting task corresponding to an interrupt request generated during transmission of the task to be migrated (migration target task) executed by the processor that transmits the task, and still another task program for a receiving task executed by the processor that receives the migration target task for receiving the migration target task and succeeds execution of the migration target task. The transmitting task is accompanied by an interrupt handler (interrupt handler during migration) having a function of capturing interrupts to be captured by the migration target task (migration-target interrupt handler) when the interrupt occurs during migration of the migration target task. The migration instruction task can be expressed simply as an instruction task. Further, a processor that transmits the migration target task is expressed as a transmitting processor, and a processor that receives the migration target task is expressed as a receiving processor. A processor in which an instruction task is running is expressed as an instruction processor. FIG. 1 depicts a state that an instruction task running on the processor 1a determines to move a migration target task running on the processor 1b to the processor 1c. In FIG. 1, the transmitting task is about to be executed by the processor 1b, and the receiving task is about to be executed by the processor 1c.

At the time of task migration, migration control information that indicates which task is to be migrated is used. An entry including a task identifier indicating a migration target task, a processor identifier indicating the transmitting processor, and a processor identifier indicating the receiving processor is recorded in the migration control information for each migration target task. That is, the migration target task is associated with the transmitting processor and the receiving processor of the migration target task. The respective entries in the migration control information are written in the shared memory 2 as an execution queue for each transmitting/receiving task of the respective processors. When transmitting the migration target task described in the entry of the queue to the receiving processor by referring to the execution queue of own task of own processor, the transmitting task deletes the entry from the execution queue, and writes the deleted entry in the execution queue of the receiving task of the receiving processor. When finishing reception of the migration target task described in the entry by referring to the entry written in the execution queue of the own task of the own processor, the receiving task deletes the entry. The location to hold the migration control information is not limited to the shared memory 2 and can be any location accessible from the processors 1a to 1d. Hereinafter, the execution queue of the transmitting task running on the transmitting processor can be expressed simply as a queue (of migration control information) of the transmitting processor, and the execution queue of the receiving task running on the receiving processor can be expressed simply as a queue (of migration control information) of the receiving processor.

To capture an interrupt generated at the time of task migration by the transmitting processor or the receiving processor and handle the interrupt without fail, a permission to handle the interrupt (interrupt handle permission) is used, which can be obtained by either one of the transmitting processor and the receiving processor. Interrupt handle permission information 6 that indicates to which of the processors the interrupt handle permission is kept, is held in the shared memory 2.

The processors 1a to 1d have interrupt setting information 7a to 7d that respectively stores setting related to the interrupt. Specifically, in the interrupt setting information 7a to 7d, an identifier of an interrupt handler allocated to an interrupt request line, of the interrupt handlers operating in the own processor, and information specifying whether to react to the received interrupt request for each of the allocated interrupt handlers are recorded. Editing the interrupt setting information 7a to 7d to allocate the interrupt handler to the interrupt request line is expressed as setting the interrupt request line to the interrupt handler (or a task including the interrupt handler). Further, a state that the pieces of interrupt setting information 7a to 7d are edited to react to the received interrupt request is expressed as a state that performing the interrupt handler is valid (enabled), and a state that the pieces of interrupt setting information 7a to 7d are set not to react to the received interrupt request is expressed as a state that performing the interrupt handler is invalid (disabled). In the configuration diagrams other than the configuration diagram of FIG. 1, the interrupt setting information 7a to 7d are not shown for avoiding complexity. Also, the kernel program is omitted from the drawings other than FIG. 1 for the same reason.

An operation of the multiprocessor system 100 according to the present embodiment is explained next. An operation of determining the transmitting processor, the migration target task, and the receiving processor by the instruction task is explained first. A determination method of the migration target task and the transmission/receiving processors by the instruction task includes a determination method (a first method) for uniformly distributing a load of the task between the processors 1a to 1d to improve processing efficiency and a determination method (a second method) for integrating the tasks to certain processors to achieve lower power consumption. The first method is explained first.

Figure 2:
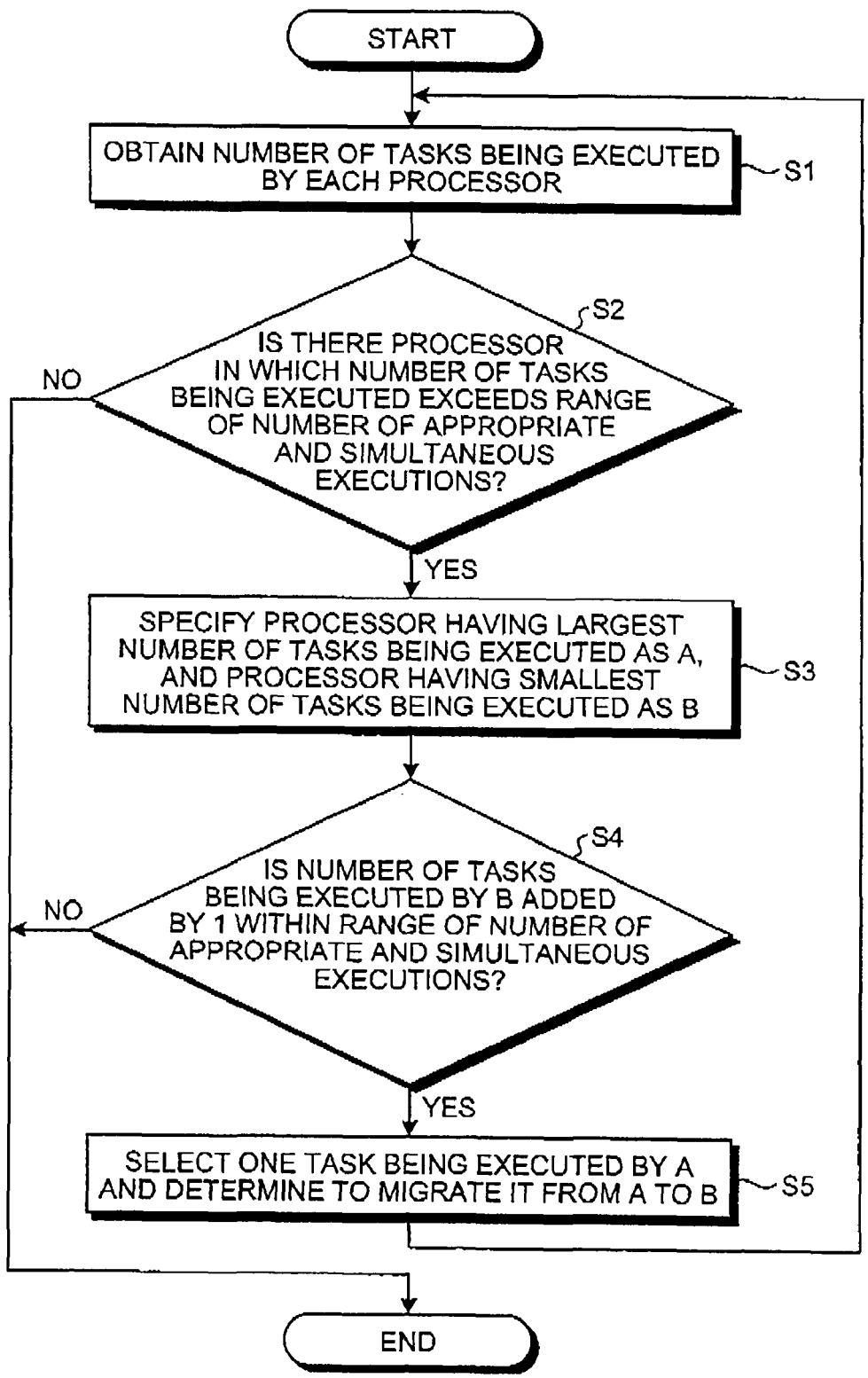
FIG. 2 is a flowchart for explaining an operation of determining a migration target task and a receiving processor according to a first method.

FIG. 2 is a flowchart for explaining an operation of determining the migration target task and the receiving processor according to the first method. The instruction task first obtains the number of tasks being executed by the respective processors 1a to 1d (S1). The instruction task determines whether there is a processor in which the number of tasks being executed exceeds a preset range of the number of appropriate and simultaneous executions (S2). When there is no processor (NO at S2), the operation of the first method is finished. The number of appropriate and simultaneous executions is the number of tasks that can be executed appropriately and simultaneously by one processor without exceeding processing capacity thereof. Because the processing capacity of processors is generally different from each other, a value appropriate for each processor is set based on the processing capacity of the processor as the number of appropriate and simultaneous executions of tasks.

When there is a processor that has the number of tasks beyond (exceeding) the range of the number of appropriate and simultaneous executions (YES at S2), the instruction task specifies a processor having the largest number of tasks being executed as A, and a processor having the smallest number of tasks being executed as B (S3). The instruction task then determines whether a value obtained by adding one to the number of tasks being executed by the processor B is within the range of the number of appropriate and simultaneous executions of the processor B (S4). When the value obtained by adding one to the number of tasks being executed by the processor B exceeds the range of the number of appropriate and simultaneous executions (NO at S4), the instruction task finishes the operation. When the value does not exceed the range (YES at S4), the instruction task determines one task to be migrated from the processor A to the processor B as a migration target task (S5). In this case, the processor A becomes a transmitting processor, and the processor B becomes a receiving processor. After performing S5, the process proceeds to S1.

As described above, according to the first method, when there is a processor executing tasks of the number exceeding the number of appropriate and simultaneous executions, the tasks operating in the processor are specified as the migration target tasks, and a processor, in which the number of tasks to be executed does not exceed the appropriate and simultaneous executions even if the migration target tasks are added thereto, is specified as a destination processor.

Figure 3:
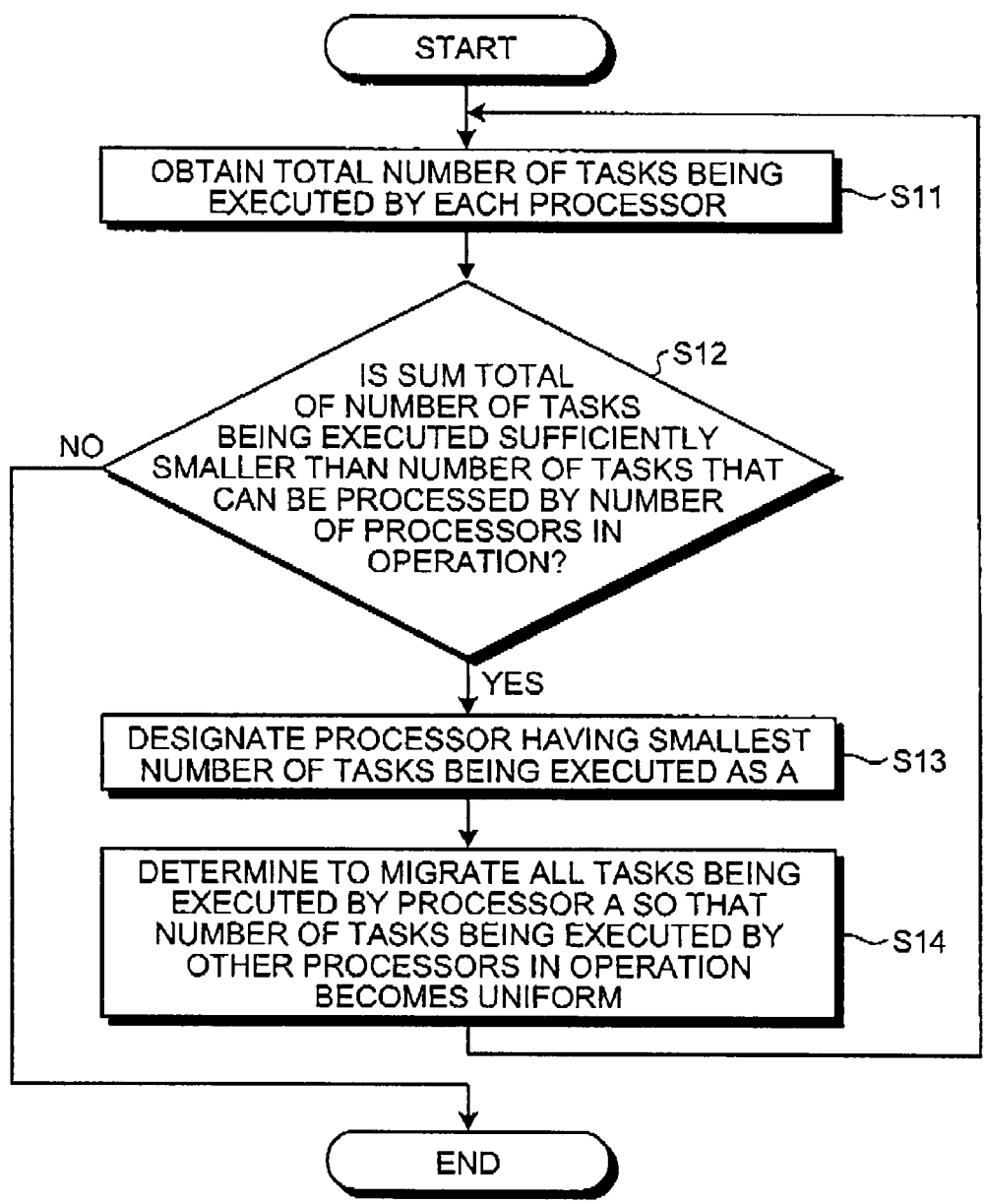
FIG. 3 is a flowchart for explaining an operation of determining a migration target task and a receiving processor according to a second method.

The second method is explained next. FIG. 3 is a flowchart for explaining an operation of determining a migration target task and a receiving processor according to the second method. The instruction task obtains the number of tasks being executed by the respective processors $1a$ to $1d$ (S11). The instruction task then determines whether the sum total of the number of tasks being executed is sufficiently smaller than the number of tasks that can be processed by the number of processors in operation (S12). When the sum total is not sufficiently small (NO at S12), the instruction task finishes the operation. When the sum total of the number of tasks being executed is sufficiently small (YES at S12), the instruction task designates a processor having the smallest number of tasks being executed as A (S13). The instruction task then determines all the tasks being executed by the processor A as migration target tasks, and determines the receiving processor of the migration target task so that the number of tasks of other processors in operation becomes uniform (S14), to proceed to S11.

According to the second method, when the sum total of the tasks being executed by all the processors can be executed by smaller number of processors, all the tasks being executed by the processor having the smallest number of tasks to be executed is specified as migration target tasks.

When the transmitting processor, the migration target task, and the receiving processor are determined, the process proceeds to an operation of migrating the migration target task. An operation of the instruction task performed at the time of task migration is explained first.

Figure 4:
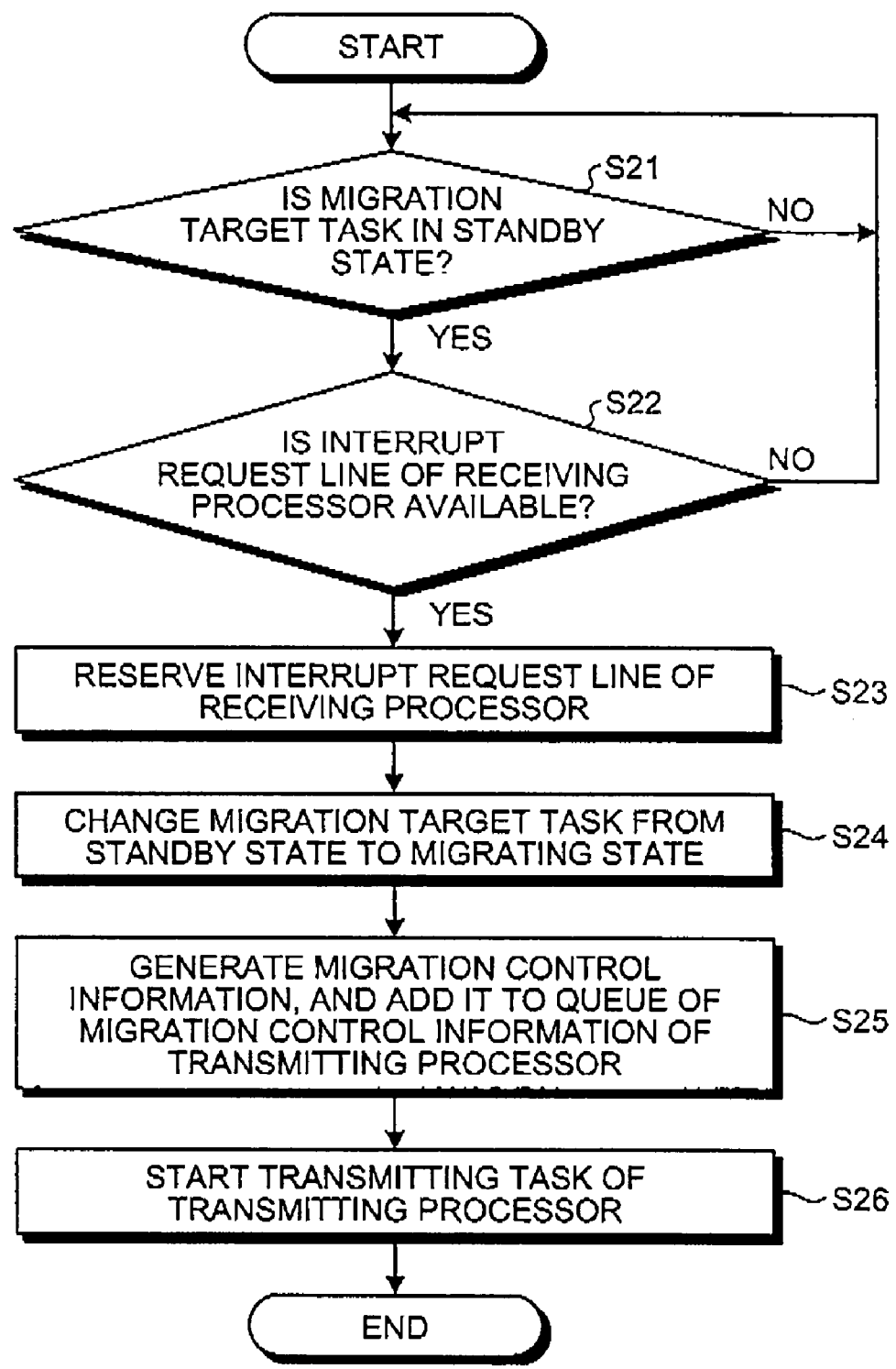
FIG. 4 is a flowchart for explaining an operation in which migration of a migration target task is started by an instruction task.

FIG. 4 is a flowchart for explaining an operation in which the instruction task starts to migrate the migration target task. The instruction task confirms that the status of the migration target task is in a standby state (S21). When the task is in a standby state (YES at S21), the instruction task determines whether an interrupt request line of the receiving processor is available (S22). The standby state indicates that the task is not being migrated. The interrupt request line of the receiving processor is being available means that any task performed by the receiving processor is not set to the interrupt request line. When the interrupt request line is available (YES at S22), the instruction task reserves the interrupt request line so that no task can be set to the interrupt request line (S23). At S21, when the migration target task is in a migrating state (NO at S21), the instruction task executes determination at S21 for other migration target tasks. The migrating state indicates that the task is being migrated.

After S23, the instruction task changes the status of the migration target task from a standby state to a migrating state (S24). The instruction task generates an entry of the migration control information, and adds the generated entry of the migration control information to a queue of the transmitting processor (S25). The instruction task then transmits a message for starting the transmitting task to the transmitting processor via the inter-processor communication unit 3 to start the transmitting task (S26), and finishes the operation.

Figure 5:
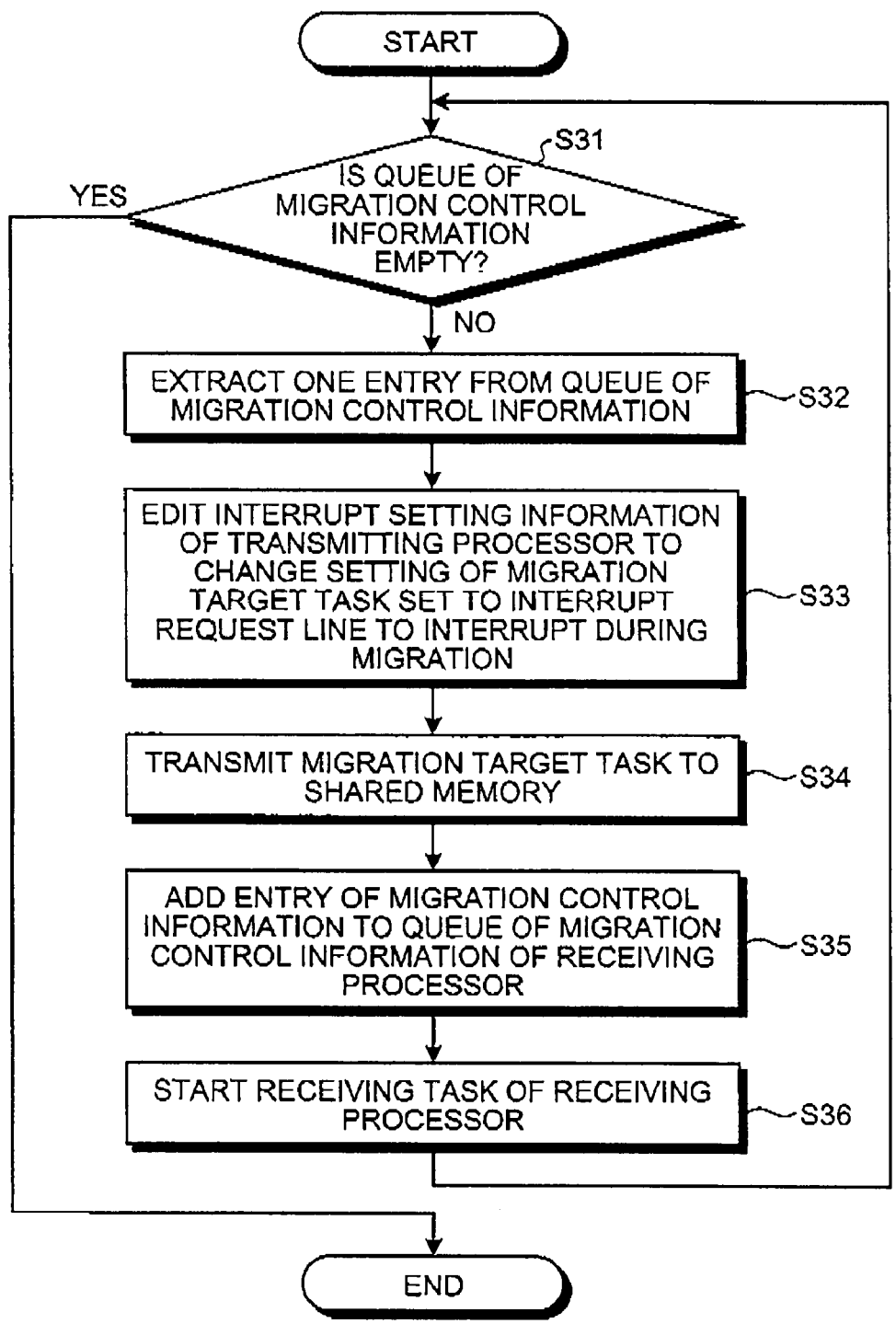
FIG. 5 is a flowchart for explaining an operation in which the migration target task is transmitted by a transmitting task.

An operation of the transmitting task started by the instruction task for transmitting the migration target task is explained next. FIG. 5 is a flowchart for explaining an operation of the transmitting task. The transmitting task first determines whether a queue of the migration control information is empty (S31). When the queue is not empty (NO at S31), the transmitting task extracts one entry from the queue of the migration control information (S32), and edits the interrupt setting information of the transmitting processor to change setting of the migration target task set to the interrupt request line to an interrupt handler during migration (S33). At this stage, performing the interrupt handler during migration is set as valid. That is, when an interrupt request is received at this point in time, the interrupt handler during migration handles the interrupt request.

Subsequently, the transmitting task transmits the migration target task (and the migration-target interrupt handler) to the shared memory 2 (S34), and adds the queue of the migration control information to the queue of the receiving processor (S35). The transmitting task does not delete the migration-target interrupt handler from own processor $1b$ at the time of transmitting the migration target task. The transmitting task starts the receiving task of the receiving processor (S36) to proceed to S31. At S31, when the queue of the migration control information is empty (YES at S31), the transmitting task finishes the operation.

Figure 6:
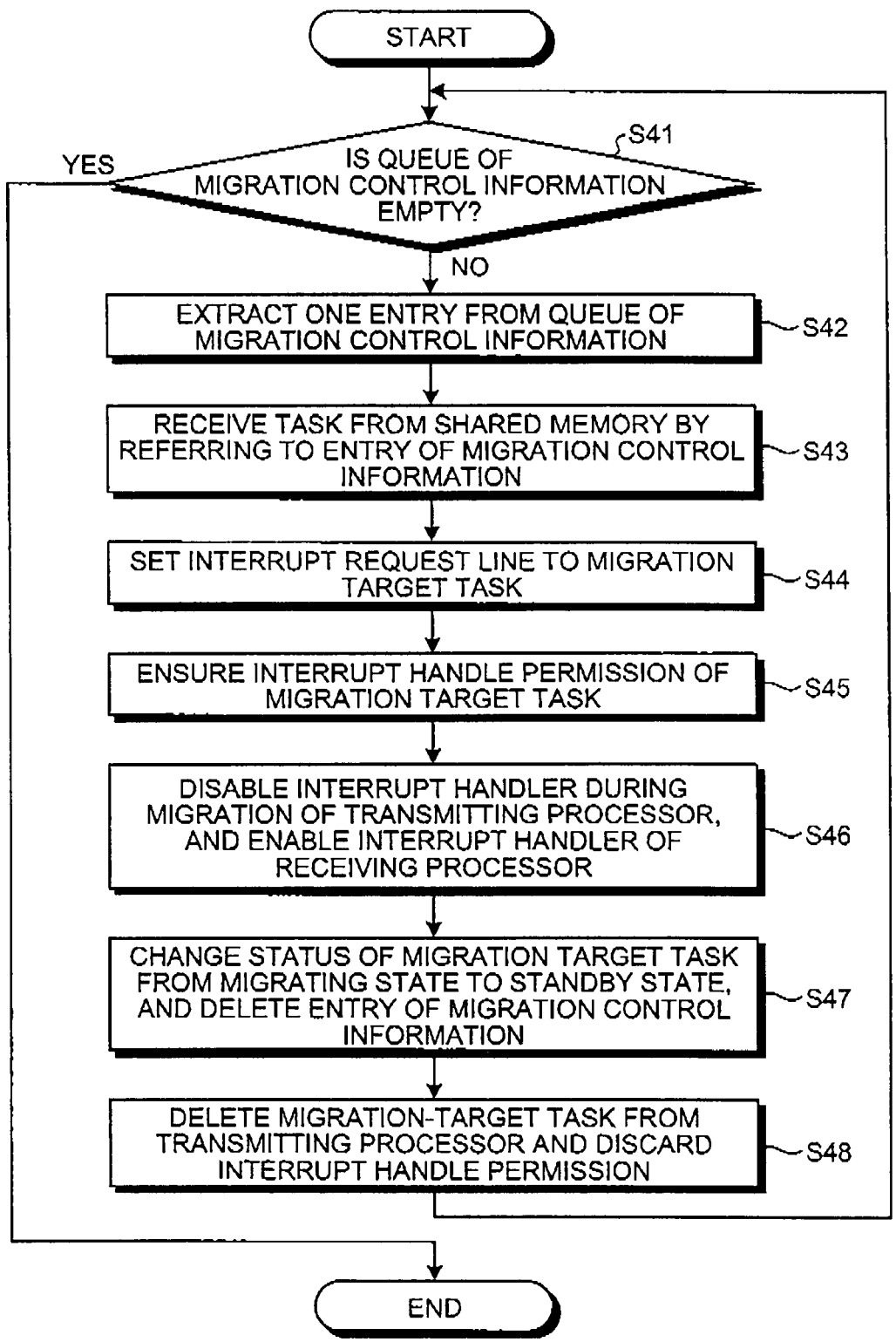
FIG. 6 is a flowchart for explaining an operation in which the migration target task is received by a receiving task.

An operation of the receiving task started by the transmitting task is explained next. FIG. 6 is a flowchart for explaining an operation of the receiving task. The receiving task first determines whether the queue of the migration control information is empty (S41). When the queue is not empty (NO at S41), the receiving task extracts one entry from the queue of the migration control information (S42) and reads the migration target task (and the migration-target interrupt handler) described in the extracted entry from the shared memory 2 to accept the task (S43). The receiving task sets the reserved interrupt request line to the migration target task (S44). At this point in time, however, performing the migration-target interrupt handler is set as invalid. When reception of the migration target task is complete, the receiving task ensures the interrupt handle permission of the migration target task (S45). That is, the receiving task describes that the receiving processor has the interrupt handle permission in the interrupt handle permission information 6. Subsequently, the receiving task disables the interrupt handler during migration of the transmitting processor, and enables the interrupt handler of the migration target task received by the receiving processor (S46). The receiving task changes the status of the migration target task from a migrating state to a standby state, and deletes the entry of the migration control information extracted at S42 from the queue (S47). The receiving task deletes the received migration-target interrupt handler of the migration target task saved in the transmitting processor from the transmitting processor, and discards the interrupt handle permission (S48) to proceed to S41. When the queue of the migration control information is empty (YES at S41), the transmitting task is finished.

It has been explained that the migration target task saves the migration-target interrupt handler in the own processor, and the receiving task deletes the migration-target interrupt handler from the transmitting processor after reception of the migration target task (and the migration-target interrupt handler). However, the transmitting task can save the migration target task as well, and the receiving task can delete the migration target task.

Figure 7:
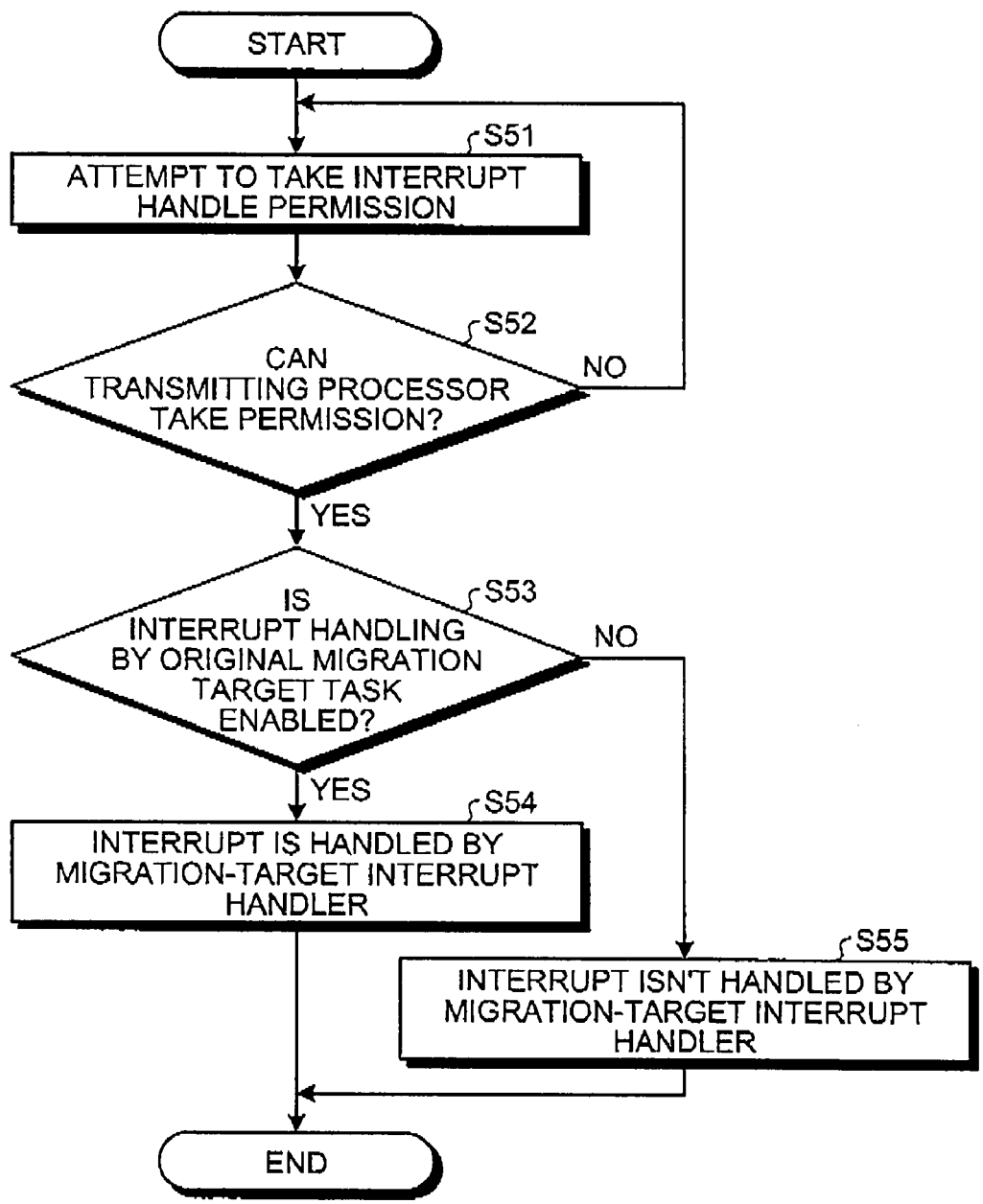
FIG. 7 is a flowchart for explaining an operation of an interrupt handling during migration.

An operation of the interrupt handler during migration accompanying the transmitting task is explained next. At S33, when an interrupt request is received in a state that the interrupt request of the transmitting processor is set to the interrupt handler during migration and interrupt handling during migration is set as valid, the operation of the interrupt handler is started. FIG. 7 is a flowchart for explaining the operation of the interrupt handler.

First, in the interrupt handler during migration, the transmitting processor attempts to take the interrupt handle permission (S51). When the transmitting processor cannot take the permission (NO at S52), the process proceeds to S51 again. When the transmitting processor can take the interrupt handle permission (YES at S52), the migration-target interrupt handler examines whether the interrupt handling by the original migration target task is enabled or disabled (S53). When the interrupt handling by the original migration target task is enabled (YES at S53), the interrupt is handled by migration-target interrupt handler (S54). When the interrupt handling is disabled (NO at S53), the interrupt isn't handled by migration-target interrupt handler (S55). The operation is finished after S54 or S55.

The operations explained above is explained next in detail with reference to FIG. 8, which is a sequence diagram of task migration, as well as referring to FIGS. 9 to 26, which are conceptual diagrams for explaining transition of an internal state at the time of task migration.

Figure 8:
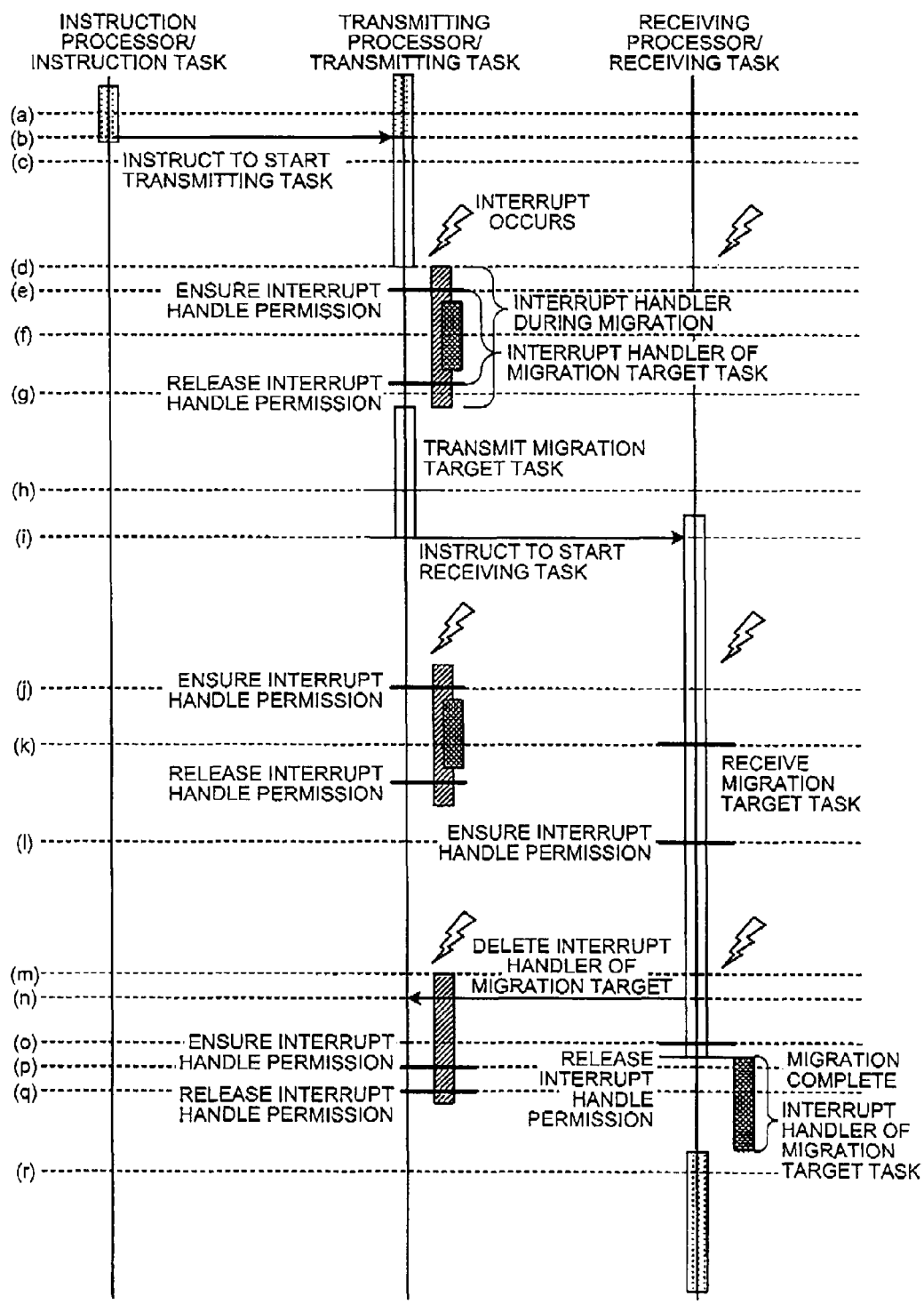
FIG. 8 is a sequence diagram of task migration.

The sequence diagram of FIG. 8 depicts a state that a task-migration instruction task on an instruction processor operates in cooperation with a transmitting task on a transmitting processor and a receiving task on a receiving processor. An overall flow is as described below. That is, the instruction processor transmits an instruction to start task migration to the transmitting processor. The transmitting processor transmits a migration target task to the shared memory 2, and the receiving processor receives the migration target task from the shared memory 2 to finish the migration. In the sequence diagram of FIG. 8, three interrupts are generated in the migration target task, and in any case, each interrupt request is properly handled. The first interrupt request is generated before the transmitting processor starts task migration, and the transmitting processor handles the interrupt ((d) to (g)). The second interrupt request is generated when the migration target task is migrated to the receiving processor, but the receiving processor is not ready to receive an interrupt, and thus the transmitting processor receives and handles the interrupt ((j) to (k)). The third interrupt request is generated during the migration of the interrupt handler, and the receiving processor handles the interrupt by using the interrupt handle permission ((l) to (r)).

Figure 9:
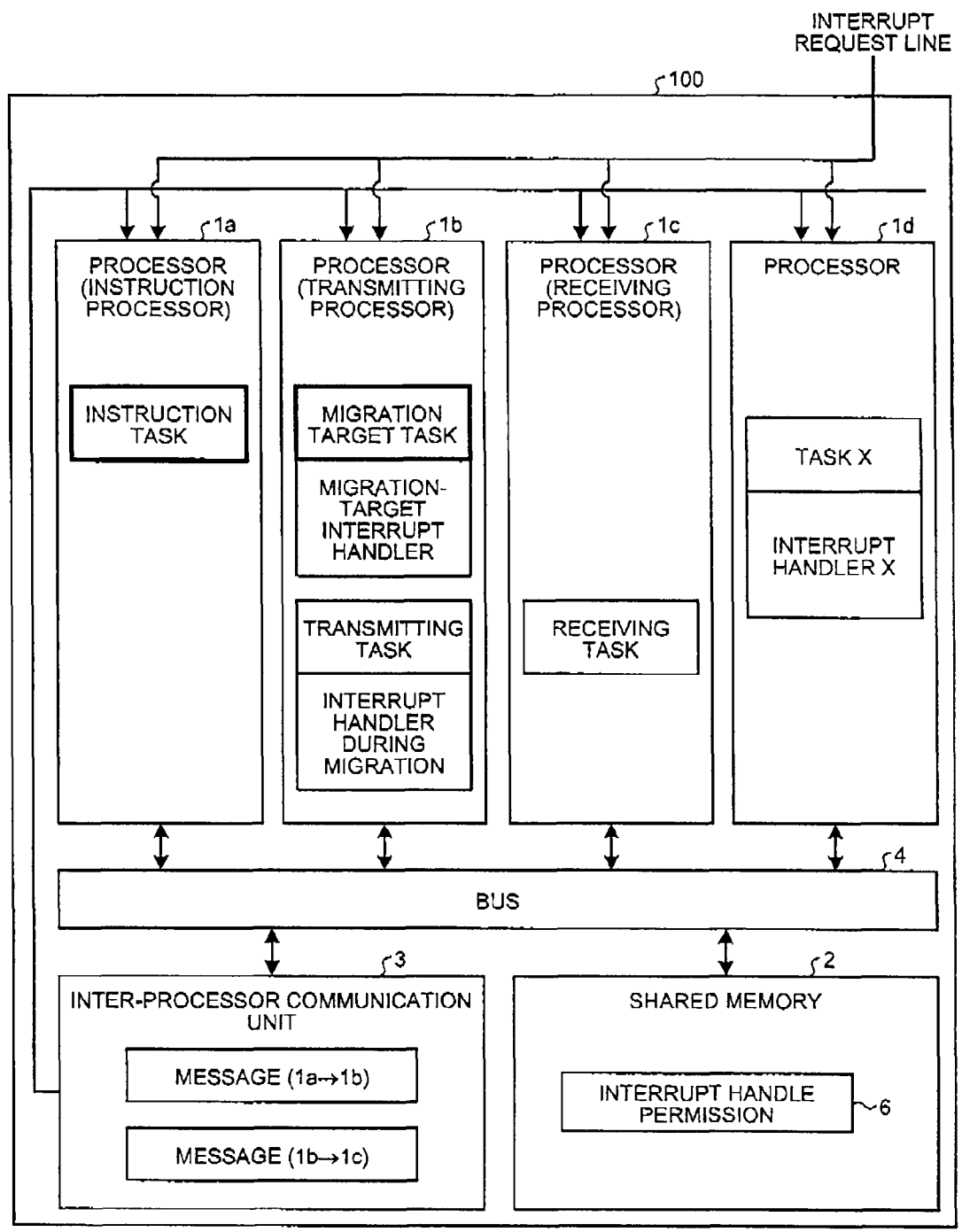
FIGS. 9 to 26 are schematic diagrams for explaining an internal state of a multiprocessor system.

Respective states of (a) to (r) in the sequence diagram shown in FIG. 8 are explained with reference to FIGS. 9 to 26. FIG. 9 depicts an internal state of an initial state (a). In the initial state, the instruction task and the migration target task are in operation. Tasks in operation are distinguished from tasks not in operation by drawing a frame with a thick line. In the initial state, task migration is started by the operations at S21 to S25. In FIG. 9, an area where a message from the processor 1a as the instruction processor to the processor 1b as the transmitting processor is written (described as message (1a→1b)), and an area where a message from the processor 1b to the processor 1c as the receiving processor is written (described as message (1b→1c)) are provided in the inter-processor communication unit 3, however, no message is written in these areas at this point.

Figure 10:
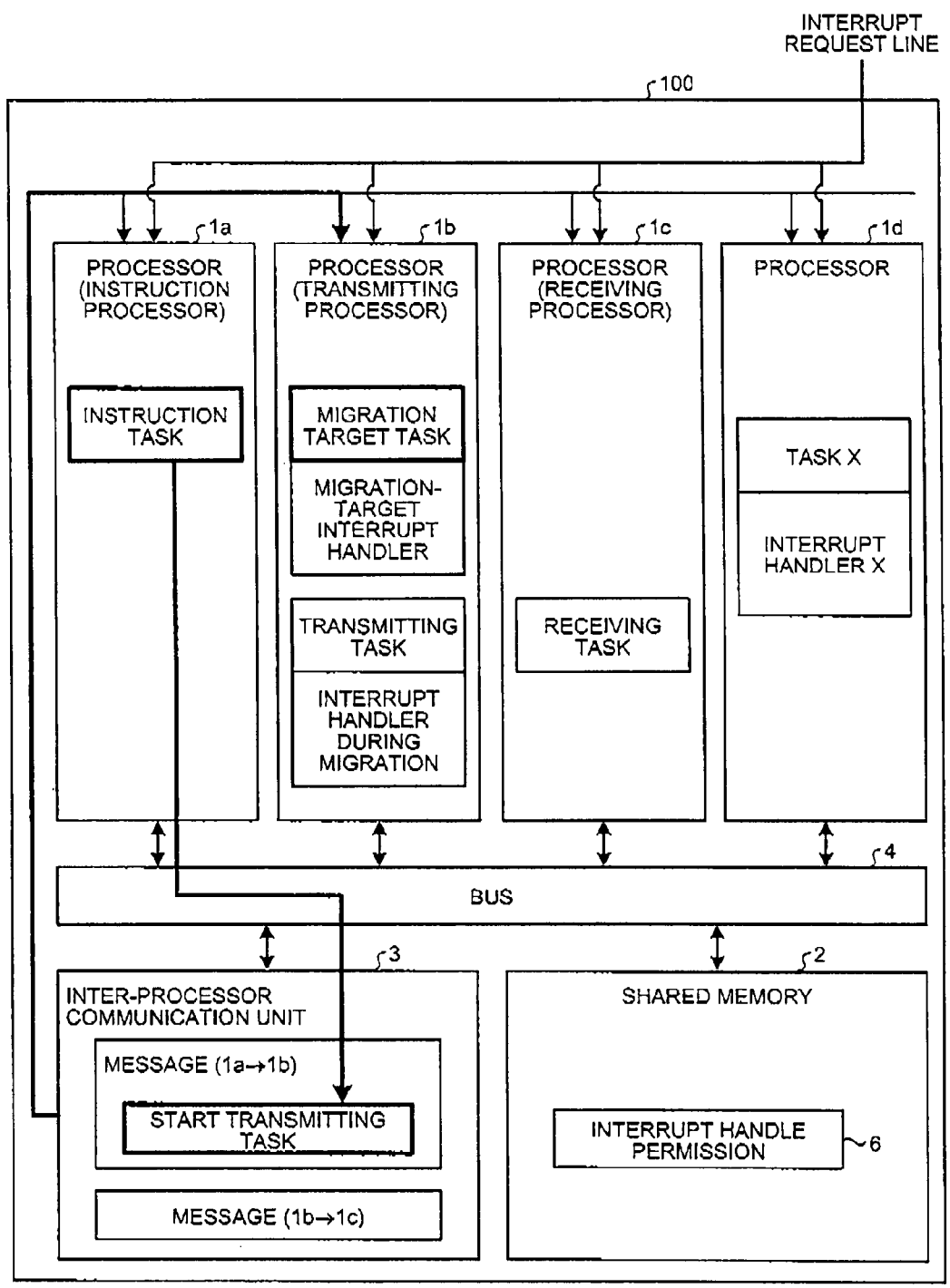

FIG. 10 depicts a state of (b). In the state of (b), a message for instructing to start a transmitting task to the processor 1b is written in the inter-processor communication unit 3 from the migration instruction task, and the message is delivered to the processor 1b. Accordingly, the migration target task is suspended, and the transmitting task is invoked. This operation corresponds to the operation at S26.

Figure 11:
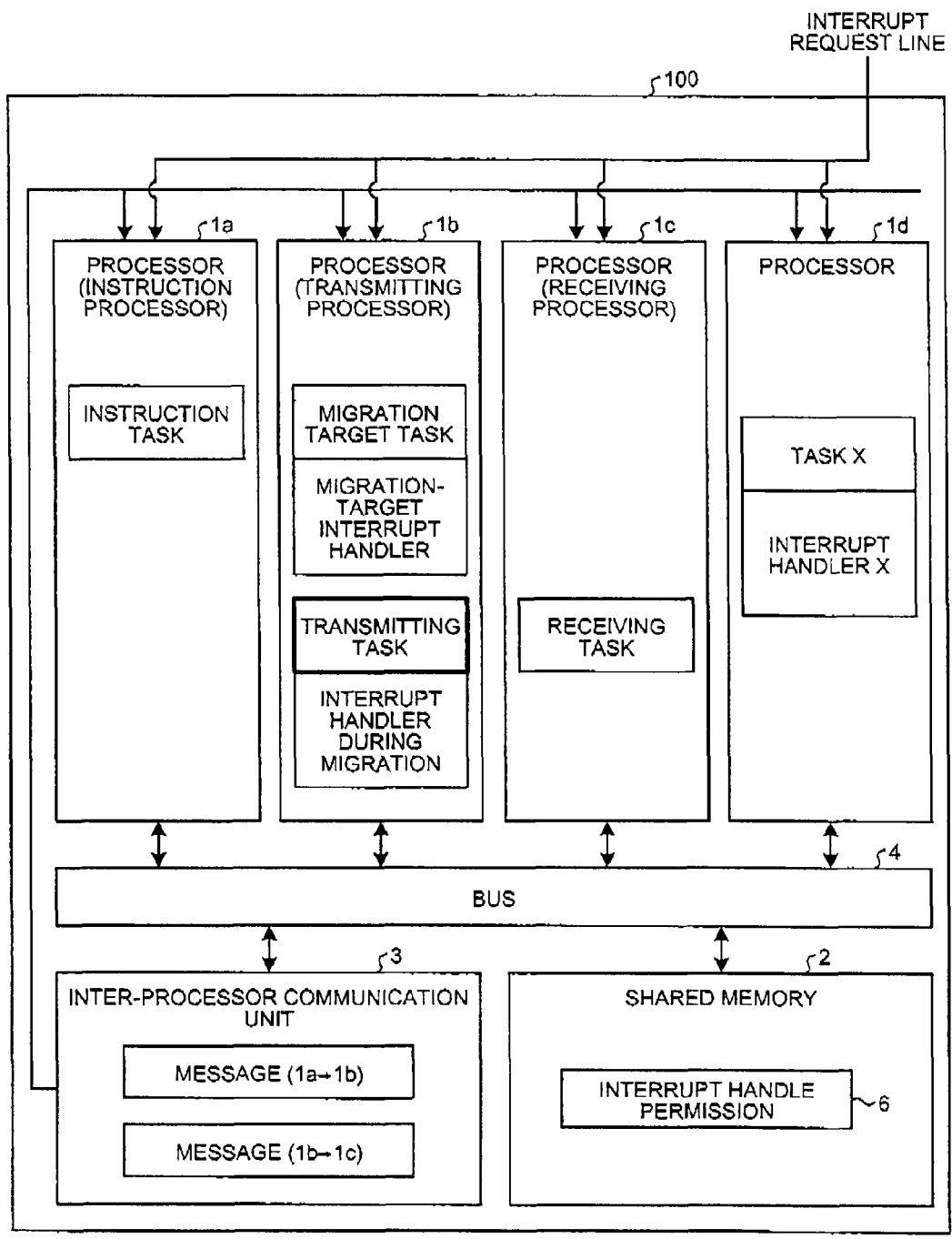
Figure 12:
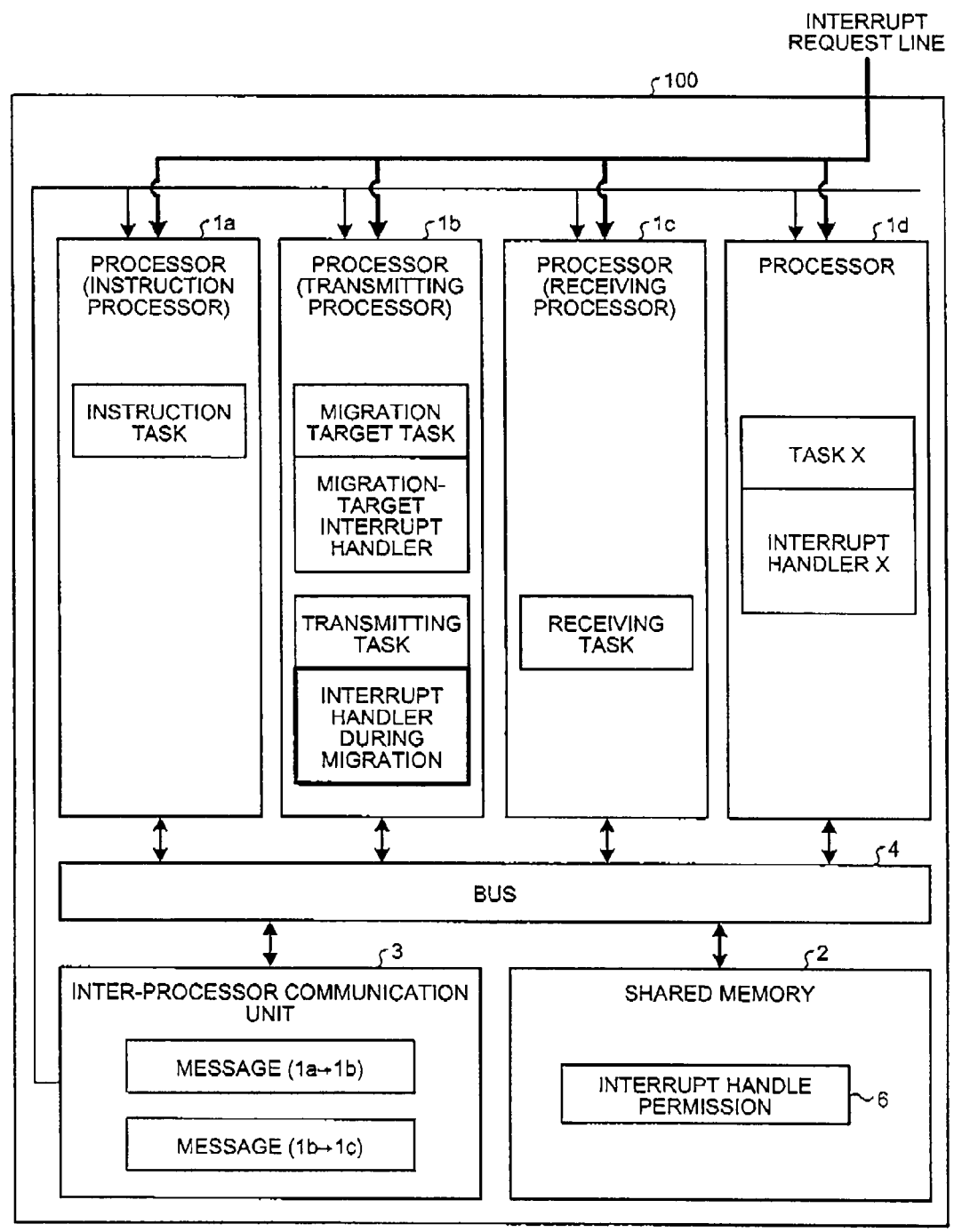
Figure 13:
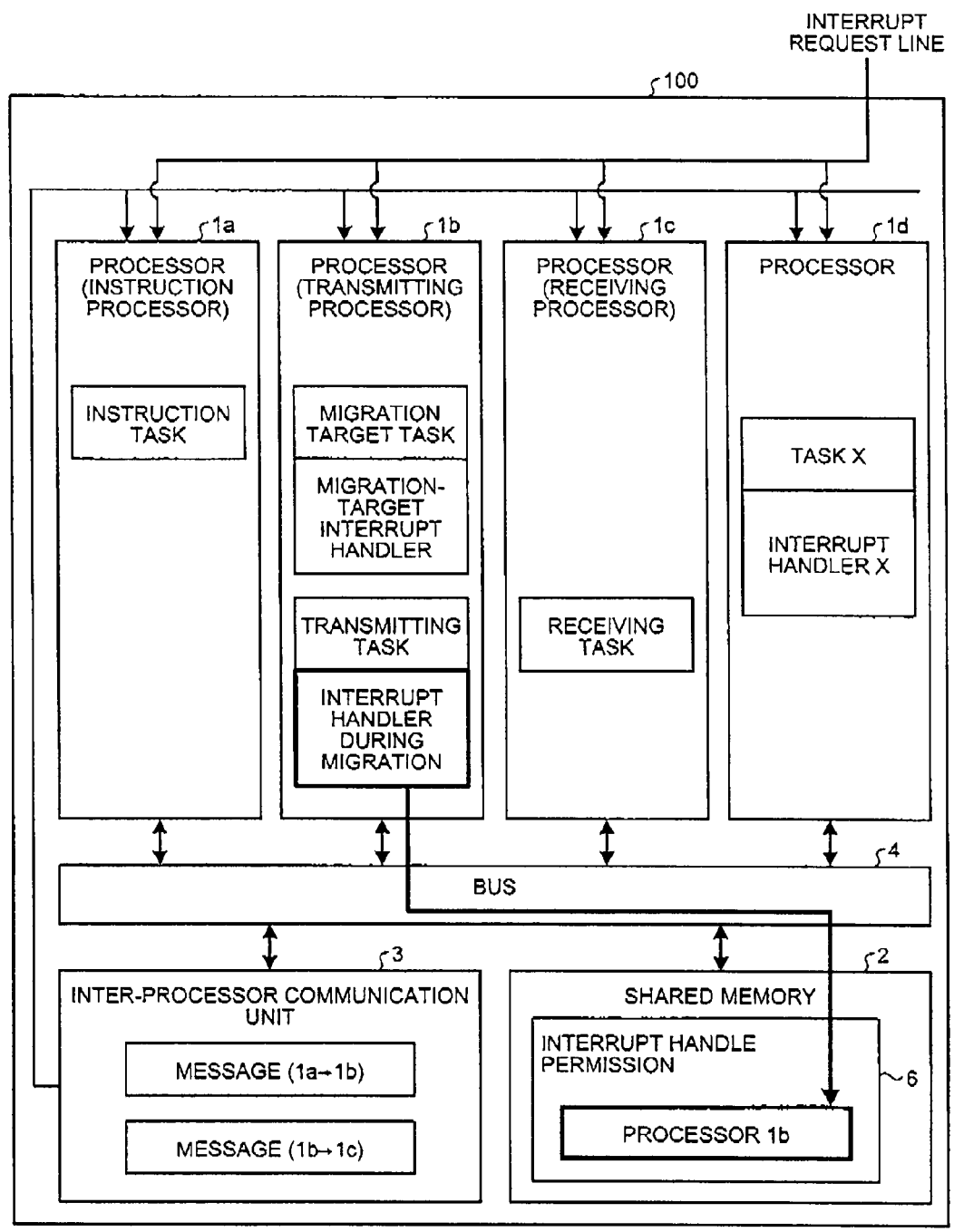
Figure 14:
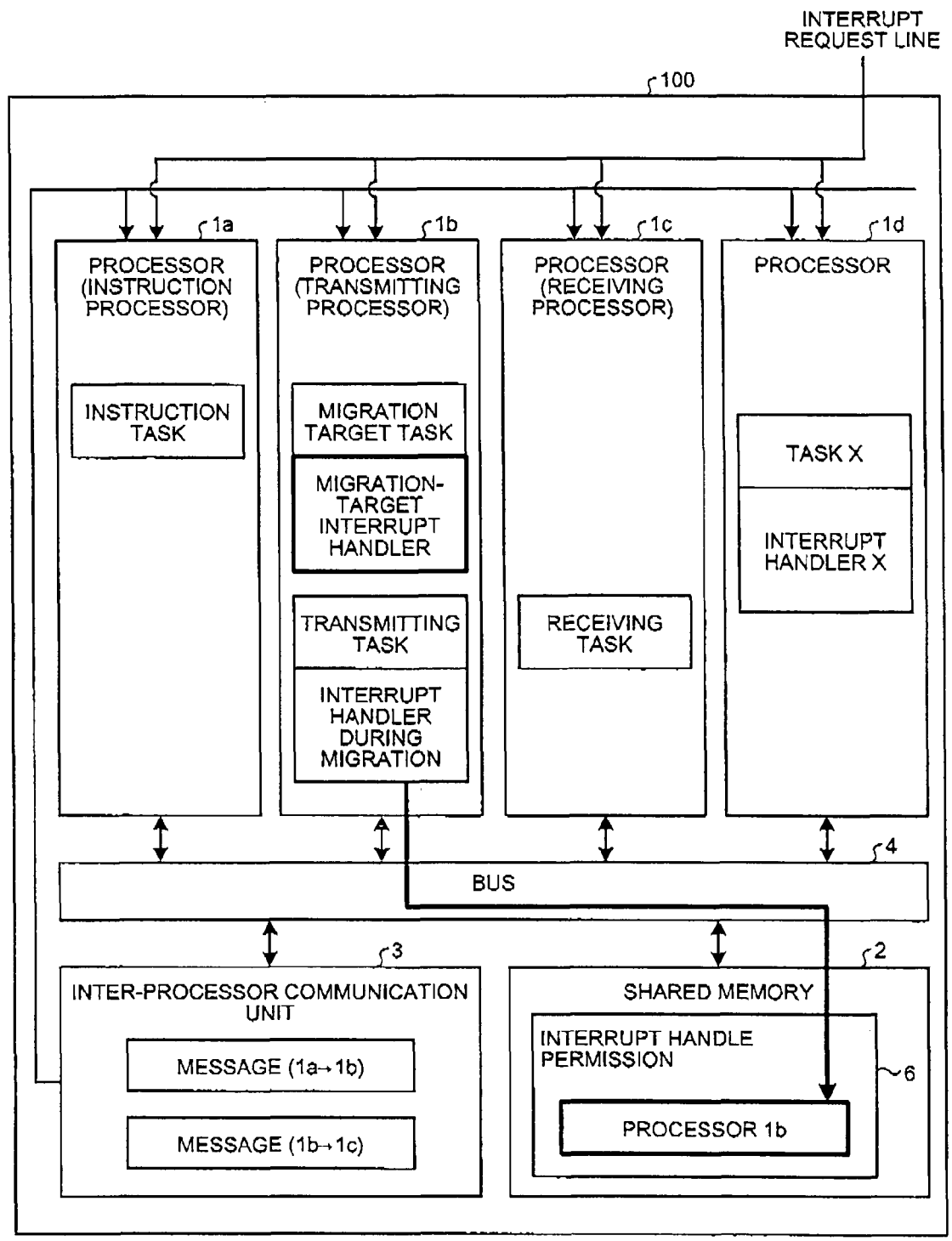
Figure 15:
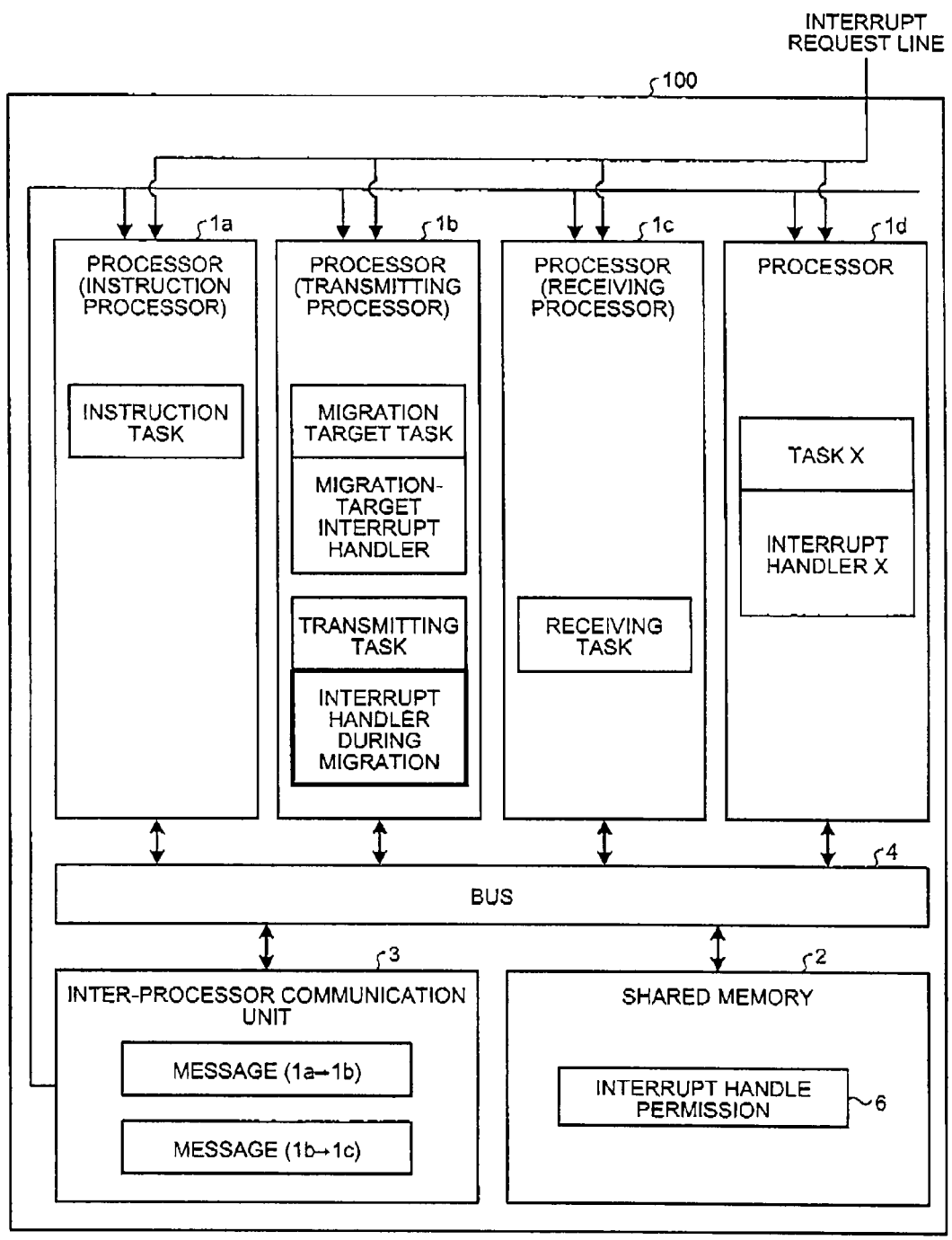

FIG. 11 depicts a state of (c). In this state, the transmitting task is started. FIG. 12 depicts a state of (d). The state expresses a state immediately after an interrupt occurs in the migration target task during the transmission process. The states (d), (e), (f), and (g) shown in FIGS. 12, 13, 14, and 15, respectively, explain a change in a state of a series of processes with respect to the interrupt. In FIG. 12, the interrupt is processed by the transmitting processor 1b, and not the migration-target interrupt handler but the interrupt handler during migration is performed first. In FIG. 13, the interrupt handler during migration gets the interrupt handle permission. In this case, because the interrupt handle permission is not held by any processors, the interrupt handle permission is kept by the interrupt handler during migration. Because the interrupt handle permission is held and the migration-target interrupt handler is held by the processor 1b, the migration-target interrupt handler is performed by the processor 1b in FIG. 14. After completion of the migration-target interrupt handler, as shown in FIG. 15, control is returned to the interrupt handler during migration, and the interrupt handle permission is discarded.

Figure 16:
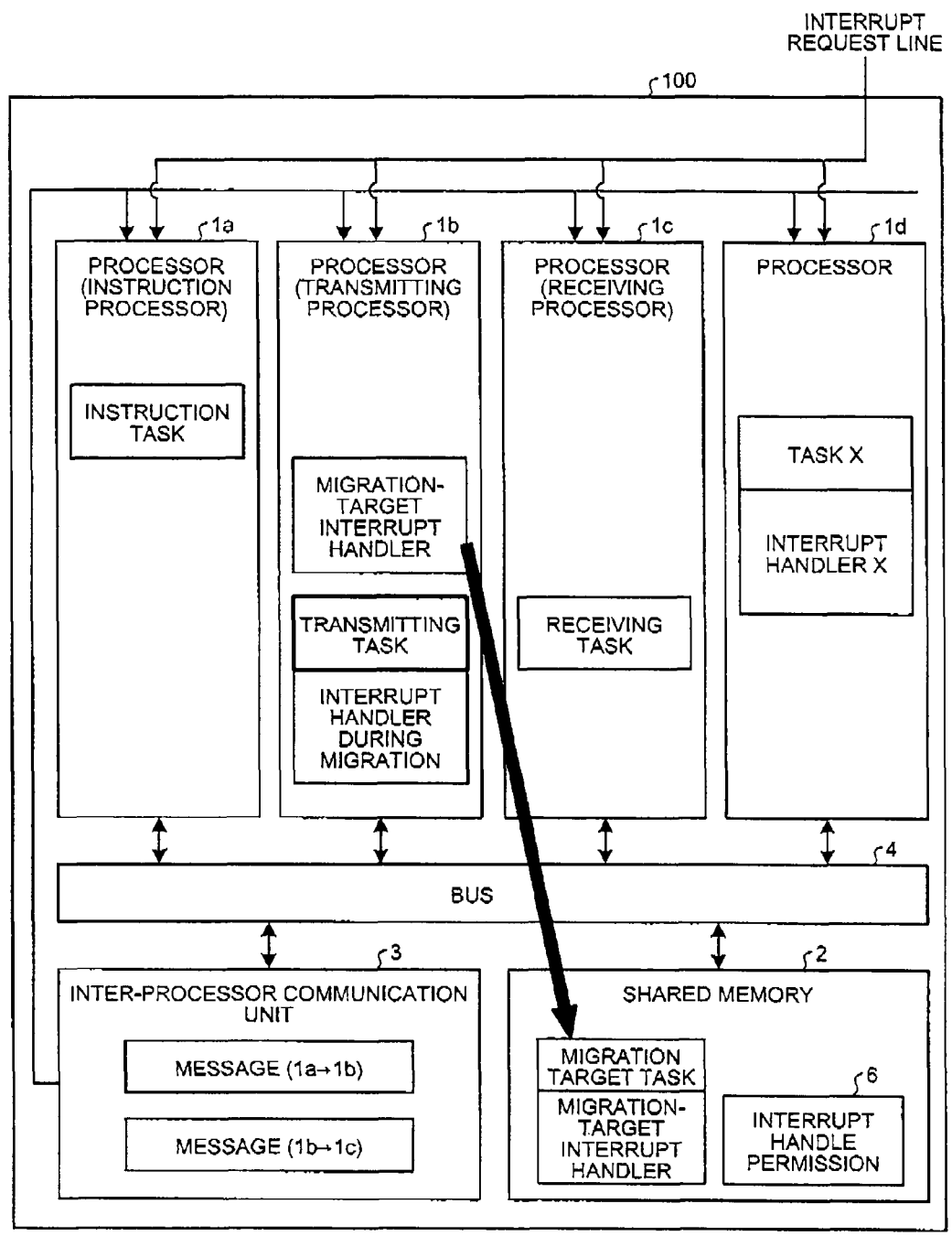

FIG. 16 depicts a state of (h). In FIG. 16, the transmitting task transmits the migration target task to the shared memory 2, so that the migration target task can be received by the processor 1c as the receiving processor. That is, the operation at S32 to S35 is being performed. At this time, although the migration target task is transmitted from the processor 1b, the migration-target interrupt handler is still in the processor 1b. That is, an interrupt can be handled continuously by the processor 1b until the receiving processor 1c is ready to handle the interrupt.

Figure 17:
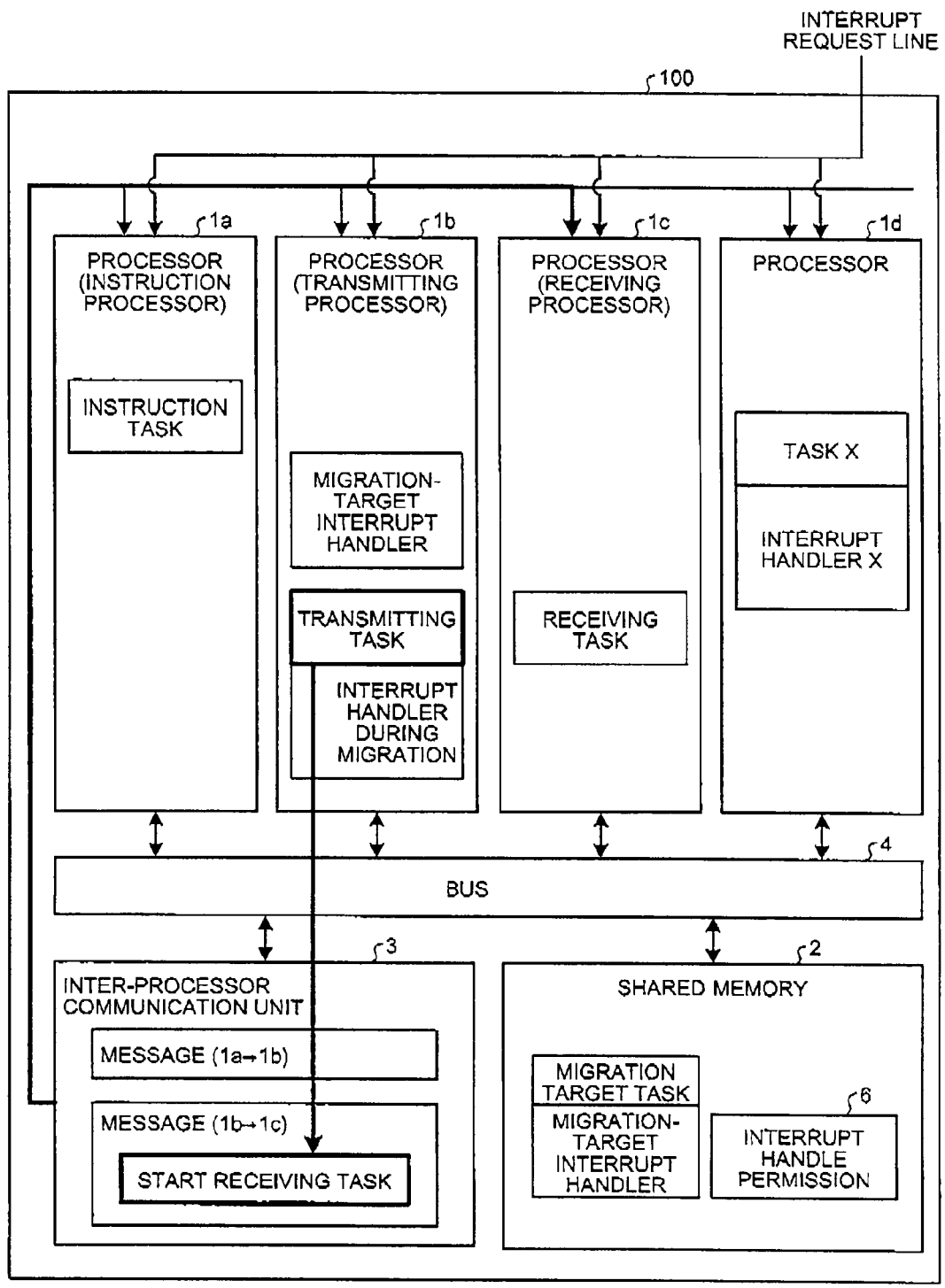

FIG. 17 depicts a state of (i). In the state of (i), because transmission of the task is complete, a startup notice is transmitted to the receiving task. This corresponds to the operation at S36.

Figure 18:
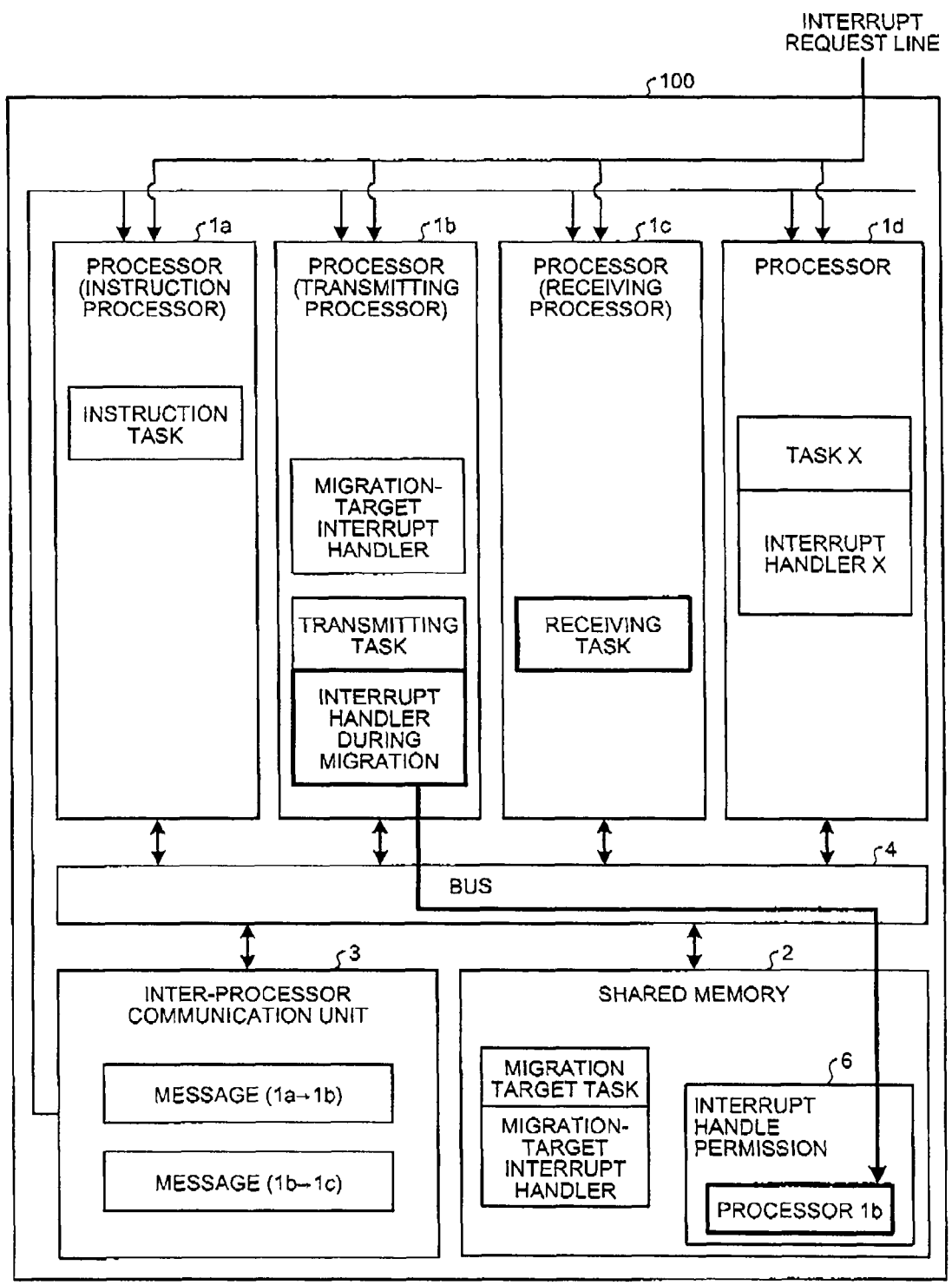
Figure 19:
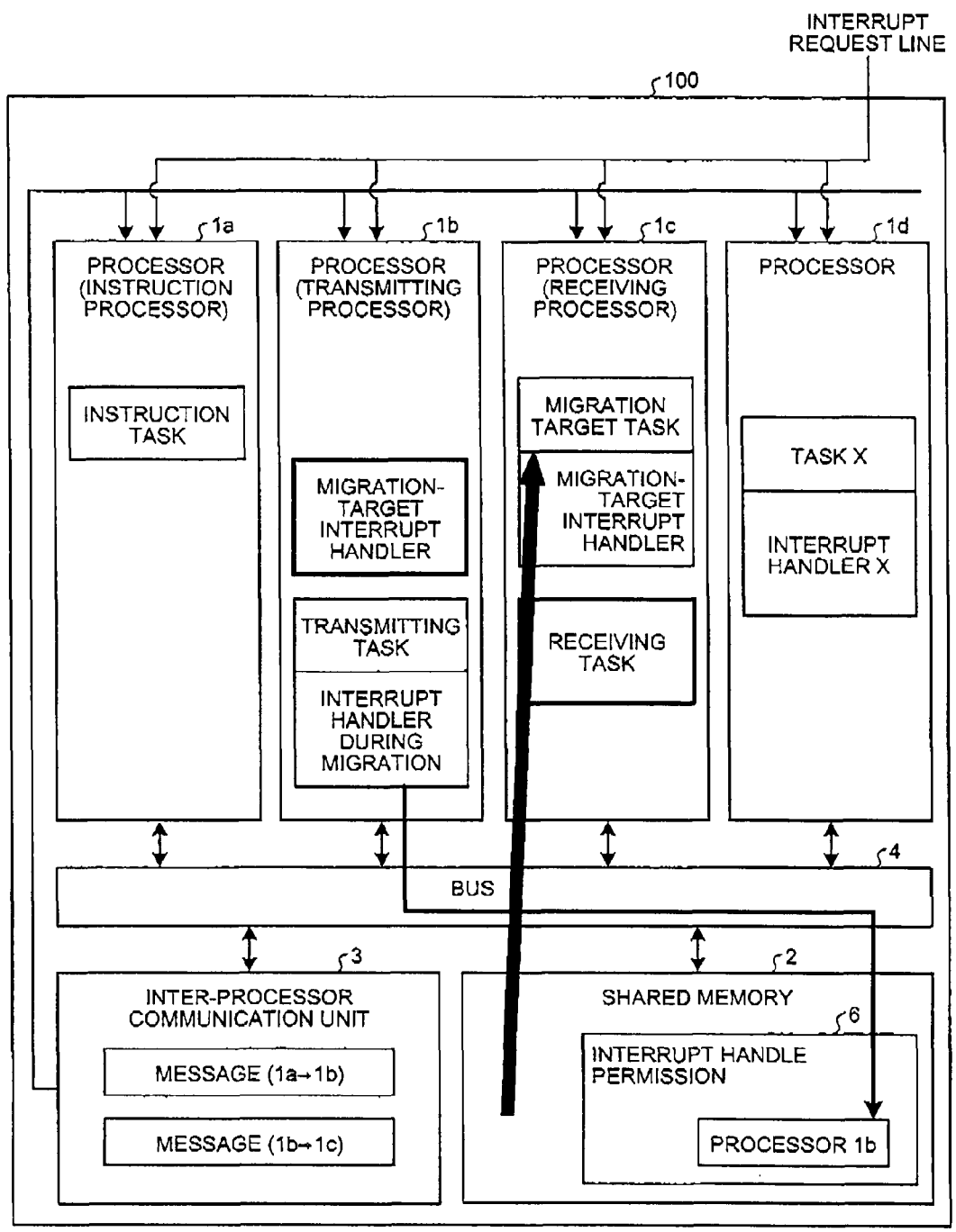

FIG. 18 depicts a state of (j), and FIG. 19 depicts a state of (k). FIGS. 18 and 19 depict a state that there is an interrupt during the reception process. The interrupt request is received by the processors 1b and 1c. However, according to the interrupt handle permission information, the interrupt handle permission is given only to the processor 1b, and thus only the processor 1b can respond to the interrupt request. Therefore, in the processor 1b, a change in a state similar to that explained with reference to FIGS. 12 to 15 is performed. On the other hand, the processor 1c continues the reception process, and the migration target task is migrated to the processor 1c. That is, the operation at S42 to S44 is performed.

Figure 20:
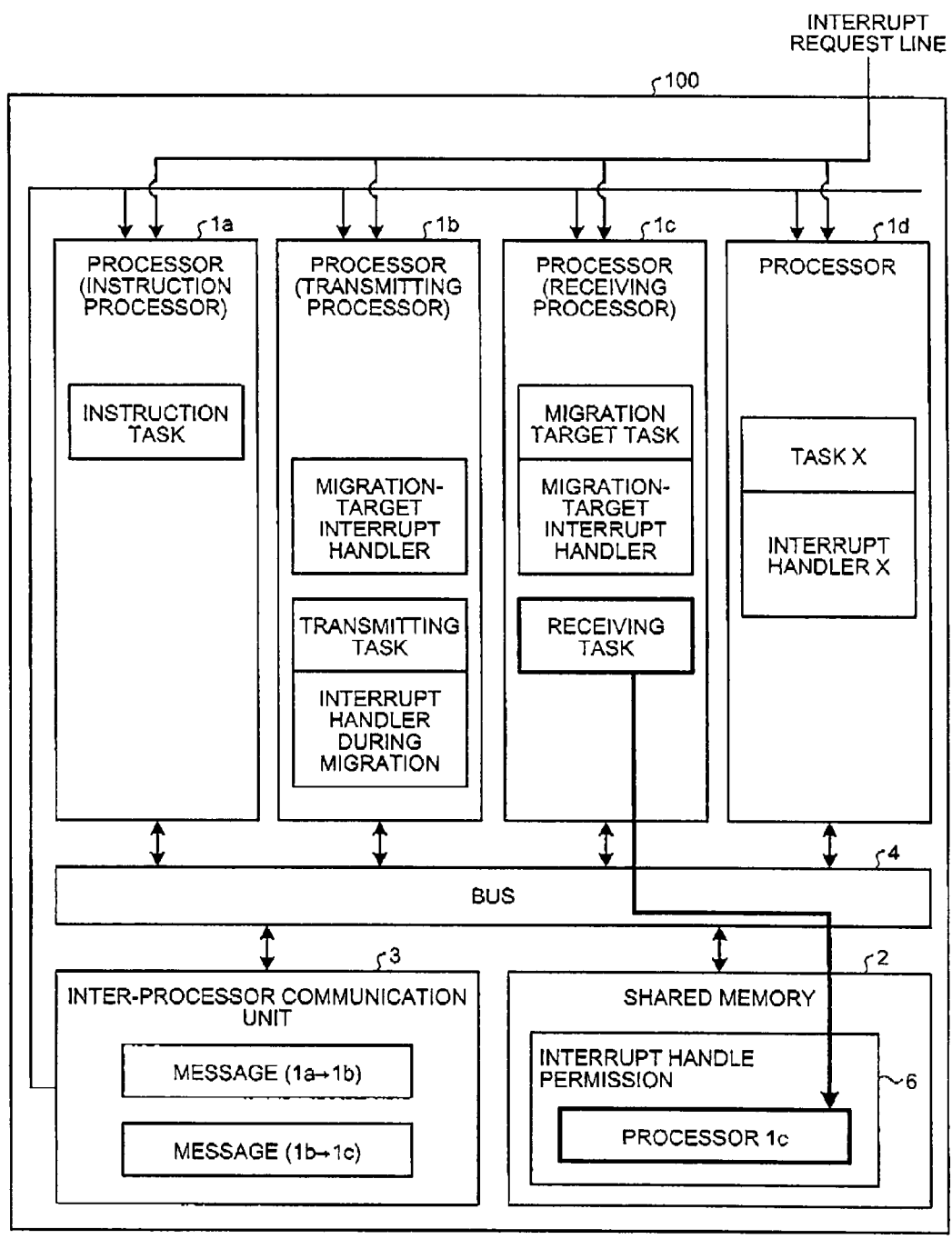
Figure 21:
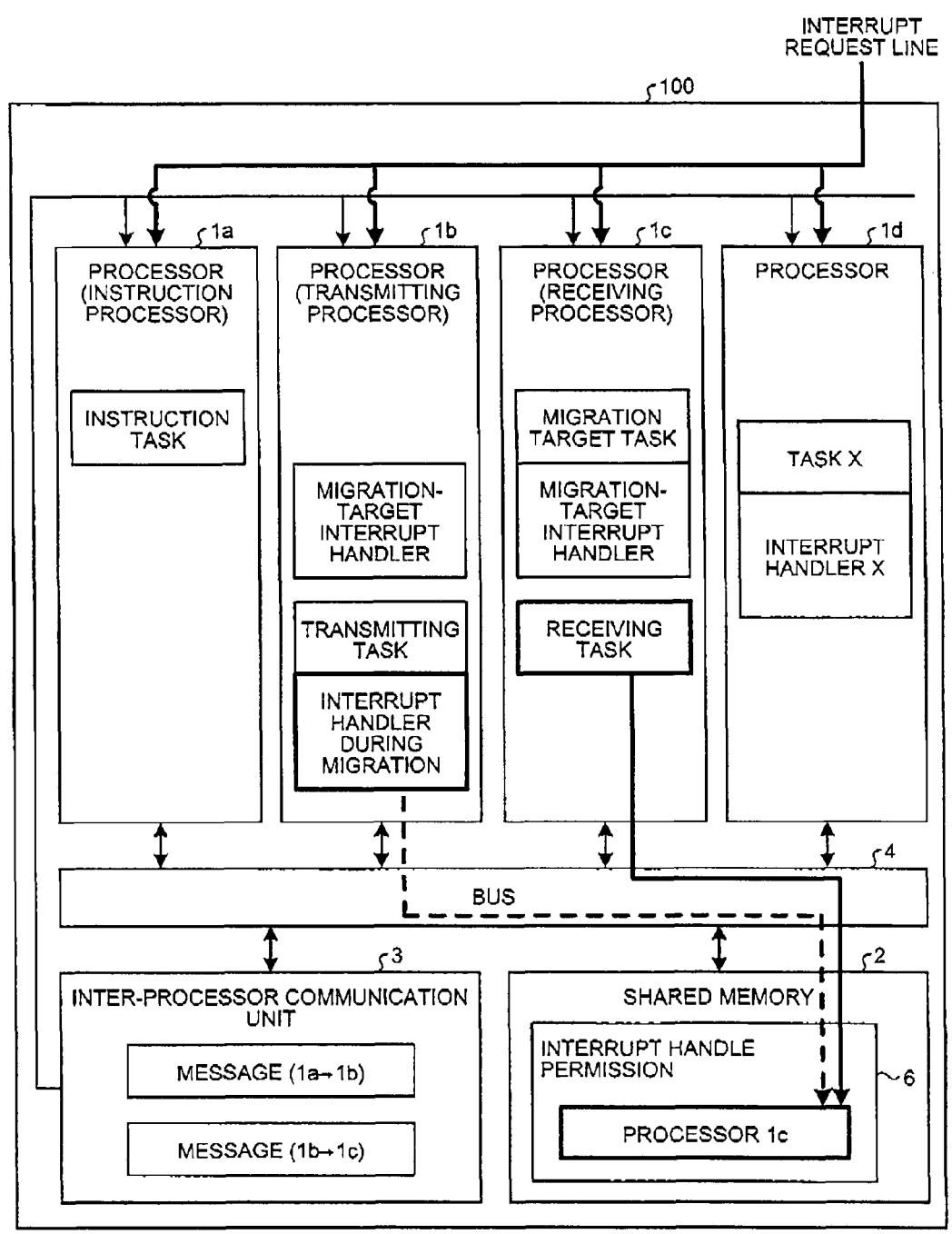
Figure 22:
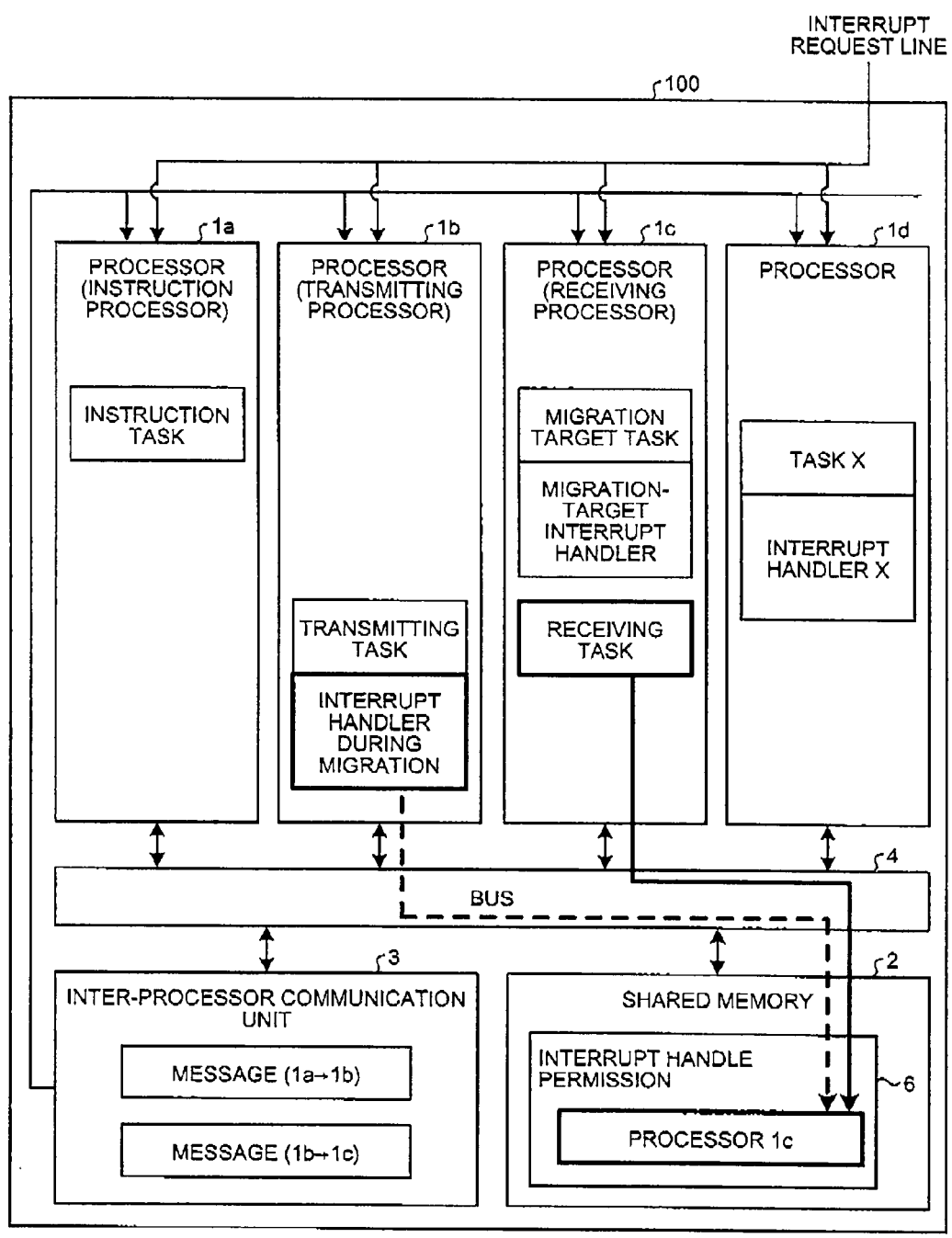
Figure 23:
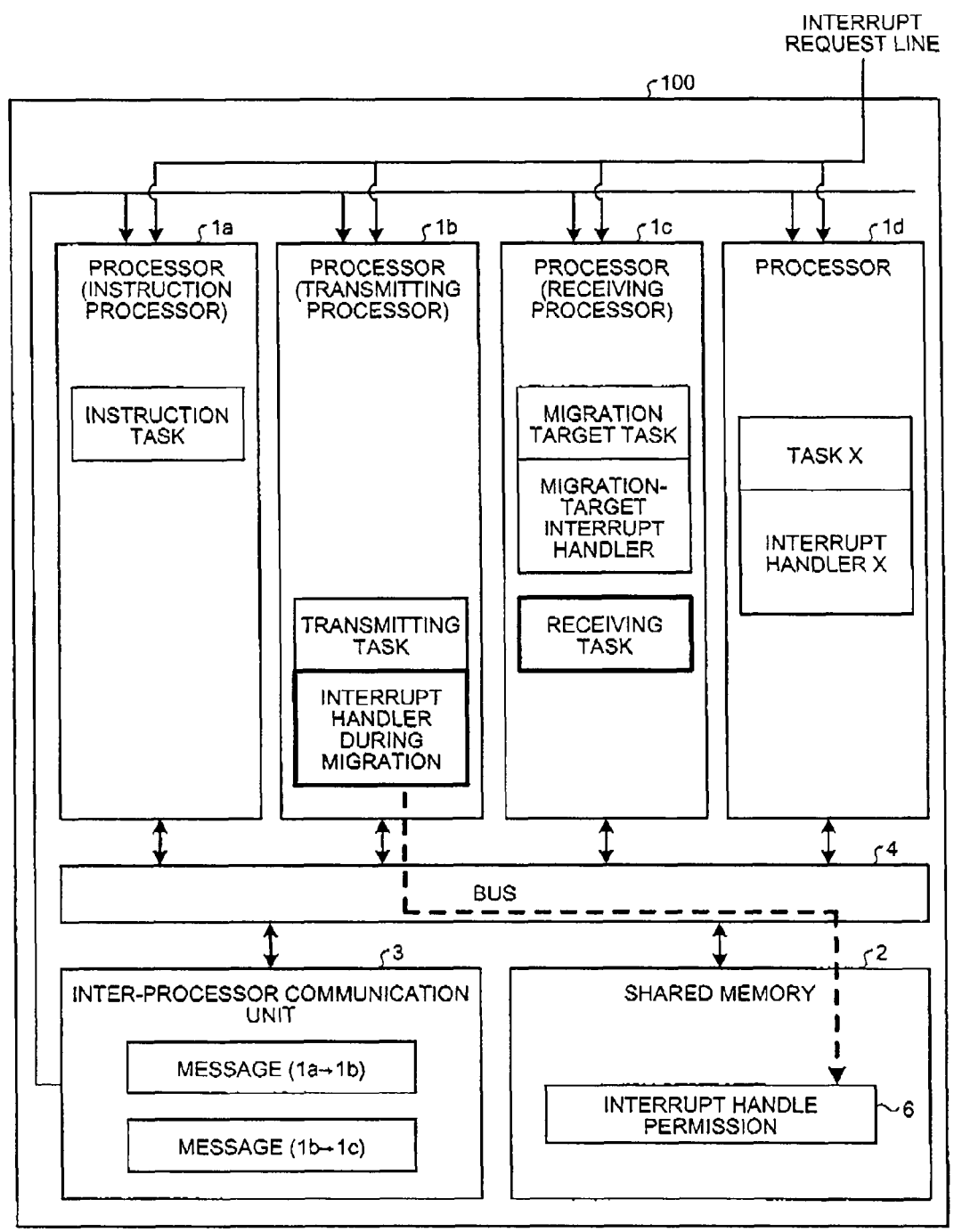
Figure 24:
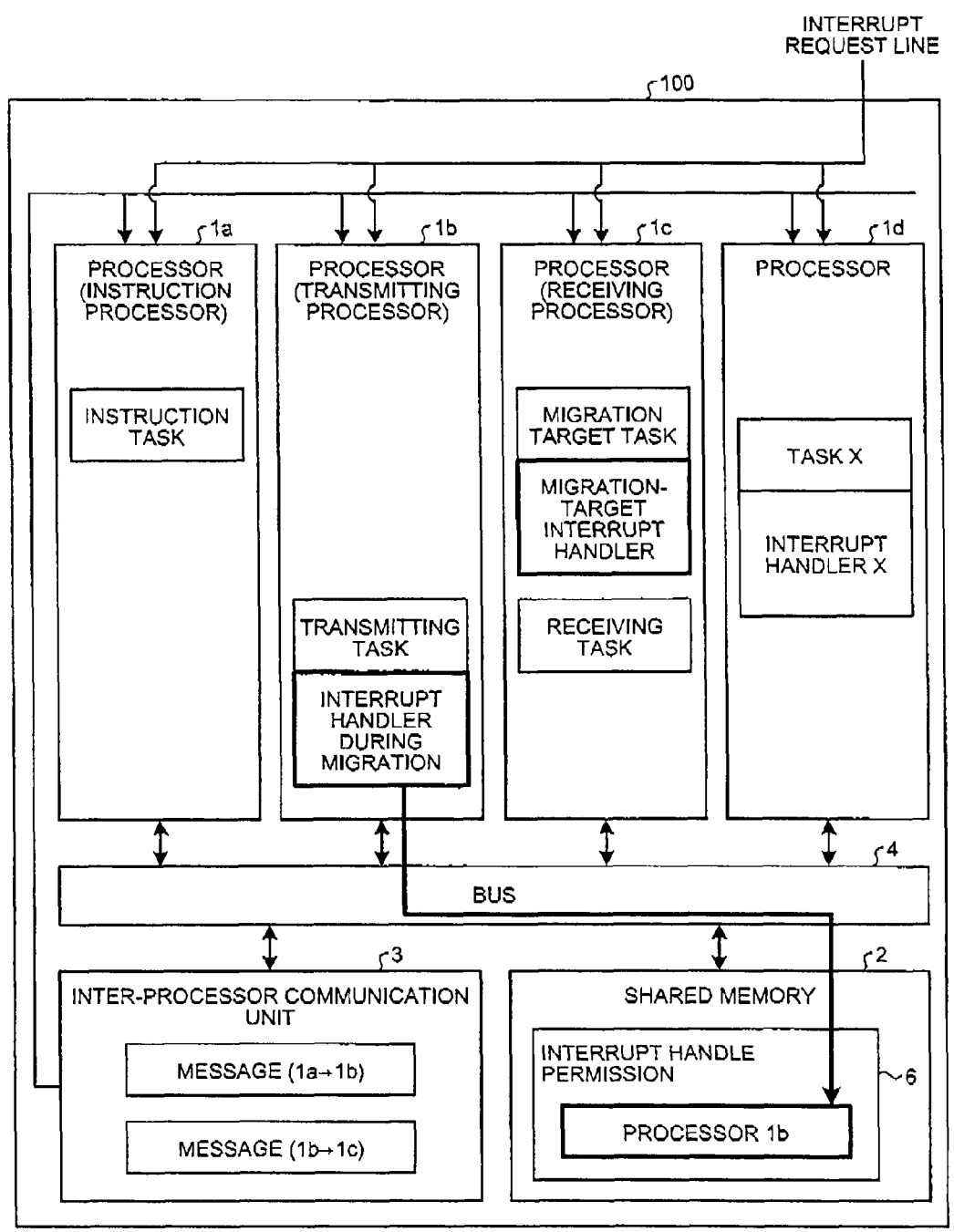
Figure 25:
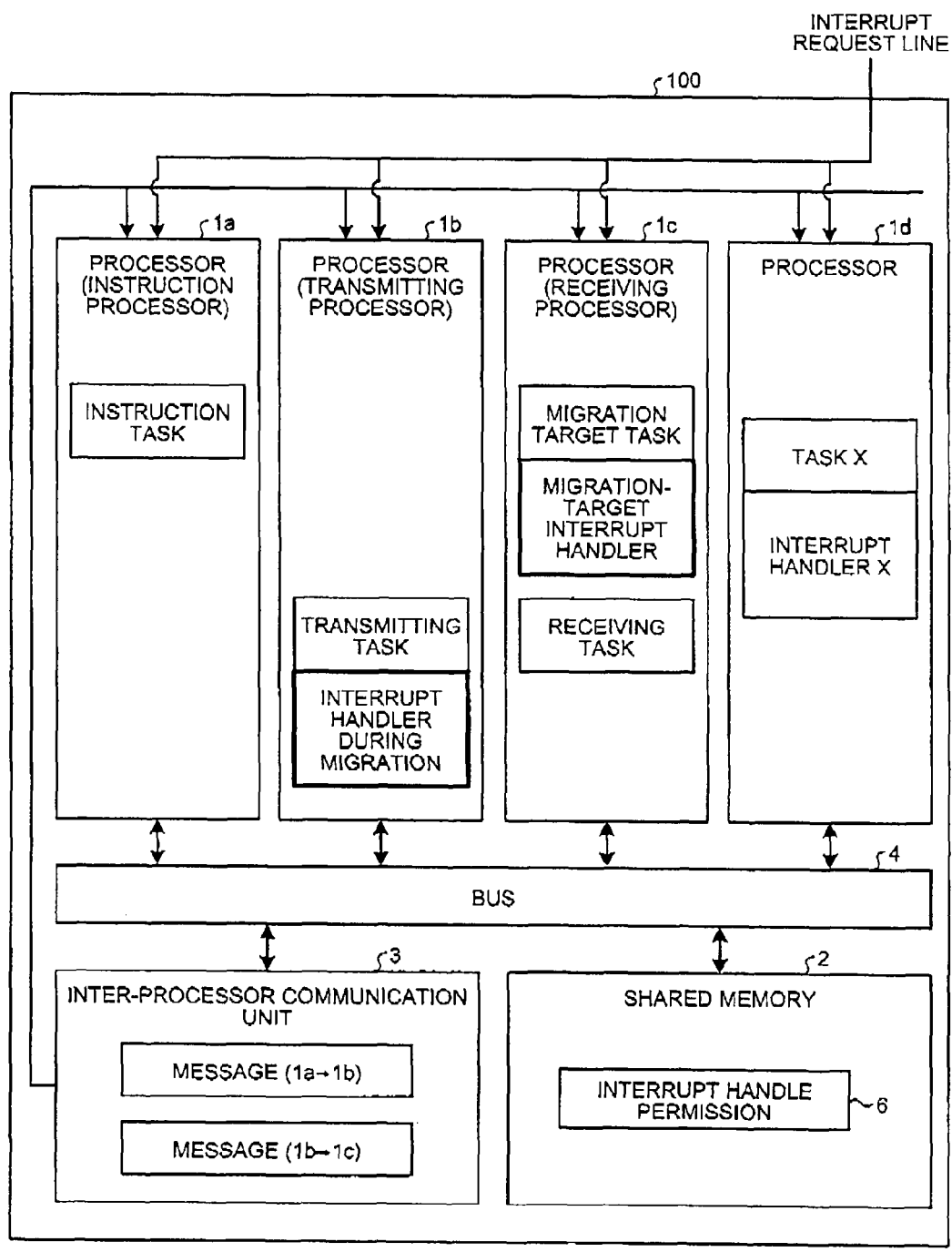
Figure 26:
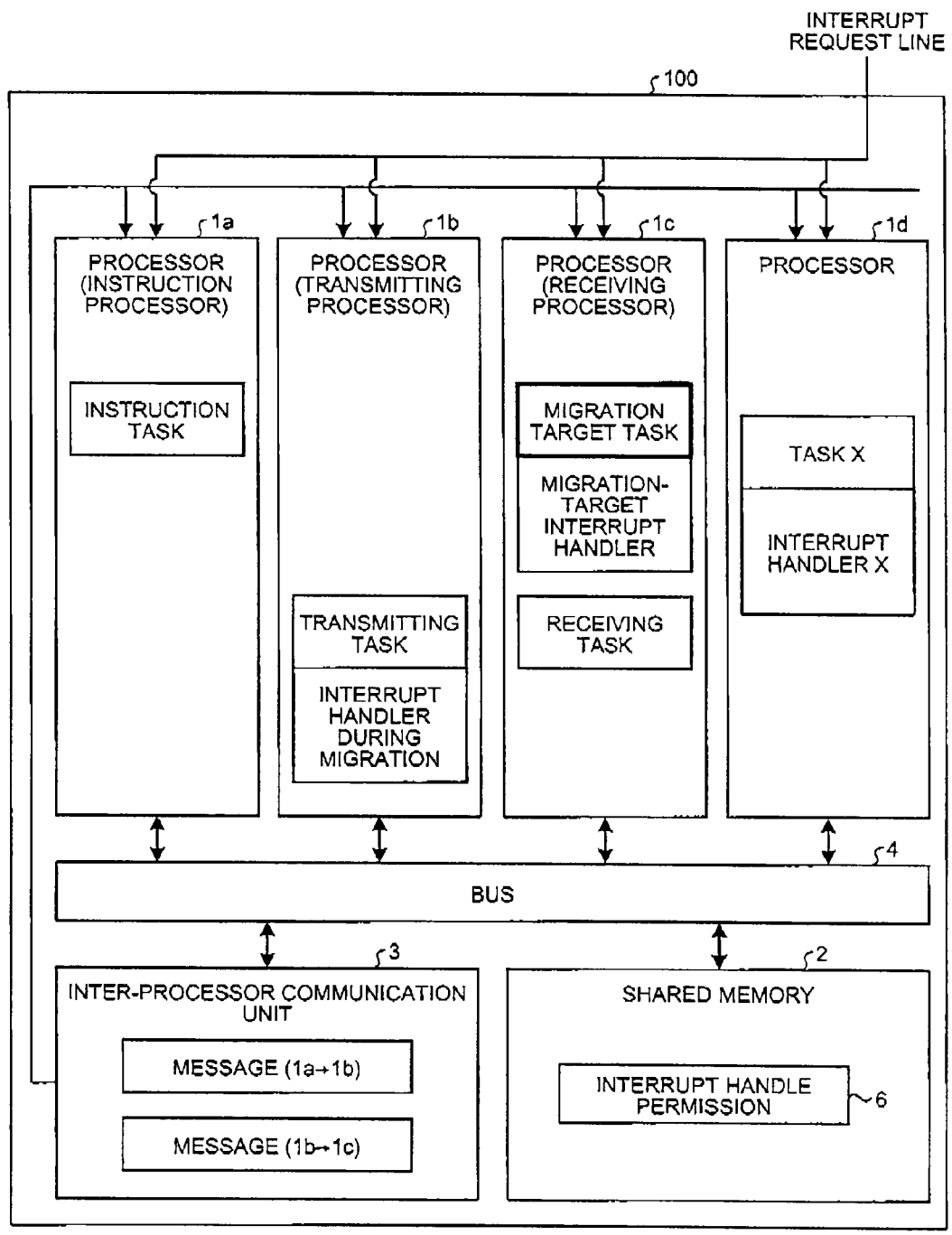

FIG. 20 depicts a state of (l), FIG. 21 depicts a state of (m), FIG. 22 depicts a state of (n), FIG. 23 depicts a state of (o), FIG. 24 depicts a state of (p), and FIG. 25 depicts a state of (q). FIGS. 20 to 25 explain the change in a state when an interrupt occurs during performing a procedure for completing the migration of the interrupt handler. At a point in time shown in FIG. 20, the receiving task (receiving processor 1c) ensures the interrupt handle permission. That is, the receiving task is performing the operation of S45. At this stage, any interrupt has not occurred yet. At a point in time shown in FIG. 21, an interrupt request has just been received, and the processor 1b attempts to ensure the interrupt handle permission. However, because the interrupt handle permission has been already ensured by the processor 1c, an attempt to ensure the interrupt handle permission fails, and the processor 1b needs to wait until the interrupt handle permission is discarded (released). Thereafter, processing of the receiving task proceeds, and in FIG. 22, the migration-target interrupt handler of the processor 1b is deleted. In FIG. 23, the processor 1c changes the migration target task to a standby state and discards the interrupt handle permission. That is, the operation up to S48 is complete. In FIG. 24, the processor 1b, which has been waiting, ensures the interrupt handle permission. However, in FIG. 25, the migration-target interrupt handler of the processor 1b has been already deleted, and thus the interrupt handler is not performed by the processor 1b. Instead, the processor 1c performs the interrupt handler with respect to the interrupt. When an interrupt occurs during the procedure for completing the migration of the interrupt handler, the interrupt is recorded by the processor 1c, and the interrupt handler is performed after completion of the migration of the interrupt. The task migration is then complete and the state shifts to a state of (r) shown in FIG. 26.

Thus, according to the present embodiment, when a task operating in the own processor is shifted to the receiving processor, the transmitting task for transmitting the migration target task to the receiving processor is executed. When an interrupt request to be received and executed by the interrupt handler accompanying the migration target task occurs during transmission of the migration target task, the transmitting task receives the interrupt request instead of the interrupt handler. Accordingly, a task with the interrupt handler can be migrated between the processors without suspending reception of the interrupt handler.

The receiving processor executes the receiving task for receiving the migration target task, and the receiving task ensures the interrupt handle permission, which is ensured by only one of the own processor and the transmitting processor. After the own processor completes reception of the migration target task, the migration target task is deleted from the transmitting processor, and the interrupt handle permission is discarded. The transmitting task being executed by the transmitting processor attempts to ensure the interrupt handle permission at the time of reception of the interrupt request, and when the interrupt handle permission is ensured, the migration-target interrupt handler is started. Therefore, the interrupt request generated during migration of the migration target task or before or after the migration thereof can be reliably executed.

A plurality of processors includes a migration instruction processor that executes the migration instruction task for generating migration control information specifying the migration target task and the destination processor for the migration target task. The transmitting task being executed by the transmitting processor transmits the migration target task based on the migration control information. Therefore, even when there is a plurality of migration target tasks, whose migration has been determined, these tasks can be shifted reliably.

When there is a processor executing tasks that exceed a range of the number of appropriate and simultaneous executions, the migration instruction task specifies a task operating in the processor as the migration target task, and generates migration control information specifying a processor, in which the number of tasks to be executed does not exceed the number of appropriate and simultaneous executions even if the migration target task is added thereto, as the receiving processor. Accordingly, the load of the task can be made uniform between all the processors, thereby enabling to improve processing efficiency of the task.

Further, when the total number of tasks being executed by a plurality of processors becomes a state that can be executed by less number of processors, the migration instruction task generates migration control information specifying all the tasks being executed by a processor having the smallest number of tasks being executed as migration target tasks. Accordingly, the tasks can be integrated to certain processors, and a power source of a processor that is not executing any task can be turned off, thereby enabling to achieve lower power consumption of the multiprocessor system.

Examples of the kernel used in a general-purpose system include Linux® and Windows®. Interrupt reception according to the present embodiment is such that an interrupt input to a system is uniformly input to all processors, and handling of an interrupt is entrusted to each processor. However, in Linux® and Windows®, an interrupt is once received by the kernel, and the kernel determines an interrupt required for each processor and transfers the interrupt to the processor. Such a general-purpose kernel has many functions, and can migrate tasks without using the method of the above embodiment.

However, such an interrupt reception procedure requires time for handling an interrupt to thereby increase the load of the system, and a response time with respect to the interrupt becomes long. On the other hand, according to the present embodiment, the load is applied only to a processor that is directly involved in task migration, and the throughput of the entire system is considerably smaller than that of the general-purpose kernel such as Linux® and Windows®, and the response time with respect to the interrupt is short. Further, even a kernel without many functions can realize task migration, and as a result, lower load and more flexible operation can be realized in the entire multiprocessor system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiprocessor system comprising a plurality of processors, wherein the processors execute, at a time of migrating a task running on own processor to another processor, a transmitting task for transmitting the migration target task to a destination processor, and when an interrupt request to be received and handled by an interrupt handler accompanying the migration target task is generated during transmission of the migration target task, the transmitting task receives the interrupt request instead of the interrupt handler and starts the interrupt handler, wherein the destination processor executes a receiving task for receiving the migration target task, the receiving task obtains an interrupt handle permission to perform an interrupt handler accompanying the migration target task, which is obtained by only one of the own processor and a source processor of the migration target task, and after completion of reception of the migration target task by the own processor, deletes the migration target task from the source processor and discards the interrupt handle permission, and upon reception of the interrupt request, a transmitting task being executed by the source processor attempts to obtain the interrupt handle permission, and when the interrupt handle permission is obtained, starts an interrupt handler accompanying the migration target task.

2. The multiprocessor system according to claim 1, further comprising a storage unit that is readable and writable by the processors, wherein the storage unit stores interrupt handle permission information that indicates a processor that has the interrupt handle permission, among the processors.

3. The multiprocessor system according to claim 1, wherein the processors include a processor that executes a migration instruction task for generating migration control information in which a migration target task and a destination processor of the migration target task are specified, and a transmitting task being executed by a source processor of the migration target task transmits the migration target task based on the migration control information.

4. The multiprocessor system according to claim 3, further comprising a storage unit that is readable and writable by the processors, wherein the storage unit stores the migration control information.

5. The multiprocessor system according to claim 3, wherein when there is a processor that is executing tasks of a number exceeding a predetermined number, the task operating in the processor is specified as a migration target task, and a processor, in which a number of tasks being executed does not exceed the predetermined number even if the migration target task is added thereto, is specified as a destination processor.

6. The multiprocessor system according to claim 3, wherein when a total number of tasks being executed by the processors reaches a state that can be executed by a fewer number of processors, the migration instruction task generates migration control information specifying all the tasks being executed by a processor having a smallest number of tasks being executed as migration target tasks.

7. The multiprocessor system according to claim 5, wherein the migration instruction task causes a processor that is executing the migration target task to start the transmitting task.

8. The multiprocessor system according to claim 6, wherein the migration instruction task causes a processor that is executing the migration target task to start the transmitting task.

9. A non-transitory tangible medium comprising a plurality of commands executable by a computer including a plurality of processors, wherein at a time of migrating a task running on own processor to another processor, when an interrupt request to be received and handled by an interrupt handler accompanying the migration target task occurs during transmission of the migration target task, the commands cause each of the processors to receive the interrupt request instead of the interrupt handler and start the interrupt handler, wherein the commands further cause each of the processors to:

obtain an interrupt handle permission to perform an interrupt handling accompanying the migration target task, which is by only one of the own processor and a source processor of the migration target task, at the time of receiving the migration target task; and delete the migration target task from the source processor and discard the interrupt handle permission, after completion of reception of the migration target task by the own processor.

10. The medium according to claim 9, wherein the commands further causes each of the processors to:

attempt to obtain the interrupt handle permission when the interrupt request is received during transmission of the migration target task; and start an interrupt handler accompanying the migration target task when the interrupt handle permission is ensured.

* * * * *